United States Patent
Nishiguchi et al.

(10) Patent No.: US 11,472,932 B2
(45) Date of Patent: Oct. 18, 2022

(54) HEAT-RESISTANT CHLORINE-CONTAINING CROSSLINKED RESIN FORMED BODY AND ITS PRODUCTION METHOD, SILANE MASTERBATCH AND MASTERBATCH MIXTURE, AND HEAT-RESISTANT PRODUCT

(71) Applicant: FURUKAWA ELECTRIC CO., LTD., Tokyo (JP)

(72) Inventors: Masaki Nishiguchi, Tokyo (JP); Arifumi Matsumura, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 249 days.

(21) Appl. No.: 16/582,689

(22) Filed: Sep. 25, 2019

(65) Prior Publication Data
US 2020/0017642 A1  Jan. 16, 2020

Related U.S. Application Data

(63) Continuation of application No. PCT/JP2018/010767, filed on Mar. 19, 2018.

(30) Foreign Application Priority Data

Mar. 27, 2017  (JP) .............................. JP2017-061904

(51) Int. Cl.
| | |
|---|---|
| *C08J 3/22* | (2006.01) |
| *C08J 3/24* | (2006.01) |
| *C08L 23/28* | (2006.01) |
| *C08L 27/22* | (2006.01) |
| *C08L 27/18* | (2006.01) |
| *C08J 3/20* | (2006.01) |
| *C08J 3/18* | (2006.01) |
| *C08L 27/06* | (2006.01) |

(52) U.S. Cl.
CPC .... *C08J 3/22* (2013.01); *C08J 3/18* (2013.01); *C08J 3/20* (2013.01); *C08J 3/203* (2013.01); *C08J 3/226* (2013.01); *C08J 3/24* (2013.01); *C08L 23/286* (2013.01); *C08L 27/06* (2013.01); *C08L 27/18* (2013.01); *C08L 27/22* (2013.01); *C08J 2323/28* (2013.01); *C08J 2327/06* (2013.01); *C08J 2327/22* (2013.01); *C08J 2423/28* (2013.01); *C08J 2427/06* (2013.01); *C08J 2427/22* (2013.01); *C08L 23/28* (2013.01)

(58) Field of Classification Search
CPC ....... C08J 3/22; C08J 3/24; C08J 3/203; C08J 3/226; C08J 3/18; C08J 3/20; C08J 2323/28; C08J 2327/22; C08J 2423/28; C08J 2427/06; C08J 2327/06; C08L 23/286; C08L 27/22; C08L 27/18; C08L 27/06; C08L 23/28

See application file for complete search history.

(56) References Cited

U.S. PATENT DOCUMENTS

| | | | | |
|---|---|---|---|---|
| 3,003,981 A | * | 10/1961 | Wear ..................... | C08G 59/027 523/455 |
| 4,775,500 A | * | 10/1988 | Funakoshi ............... | C08K 3/04 252/511 |
| 5,736,605 A | * | 4/1998 | Oshima ................... | C08L 27/06 524/521 |

FOREIGN PATENT DOCUMENTS

| | | | |
|---|---|---|---|
| EP | 2910611 | * | 8/2015 |
| JP | 57-25347 A | | 2/1982 |
| JP | 5-242737 A | | 9/1993 |
| JP | 06-168629 | * | 6/1994 |
| JP | 2001-101928 A | | 4/2001 |
| JP | 2004-285275 A | | 10/2004 |
| JP | 2011-207973 A | | 10/2011 |
| JP | 2015-143299 A | | 8/2015 |

OTHER PUBLICATIONS

Machine English translation of JP 06-168629, Seki et al., Jun. 1994.*
Machine English translation of JP 2004-285275, Takahashi et al., Oct. 2004.*
Machine English translation of JP 05-242737, Nakahashi et al., Sep. 21, 1993.*
International Search Report (PCT/ISA/210) issued in PCT/JP2018/010767, dated May 29, 2018.
Japanese Notice of Reasons for Refusal for corresponding Japanese Application No. 2019-509340, dated Aug. 31, 2021, with an English translation.

* cited by examiner

*Primary Examiner* — Patrick D Niland

(74) *Attorney, Agent, or Firm* — Birch, Stewart, Kolasch & Birch, LLP

(57) ABSTRACT

A method of producing a heat-resistant chlorine-containing crosslinked resin formed body, formed from: Step (a) of melt-mixing, to a base resin containing a chlorinated polyethylene and a polyvinyl chloride and a plasticizer, an organic peroxide, an inorganic filler, and a silane coupling agent, at a specific ratio, at a temperature equal to or higher than a decomposition temperature of the organic peroxide; Step (b) of mixing a silane masterbatch obtained in Step (a) and a silanol condensation catalyst; and Step (c) of crosslinking by bringing a formed body obtained by Step (b) into contact with water; wherein, in Step (a), from 5 to 55 mass % of the plasticizer is contained in 100 mass % of the base resin to be used in the reaction with the silane coupling agent; the formed body produced therefrom; a silane masterbatch and a mixture thereof; and a heat resistant product.

21 Claims, No Drawings

HEAT-RESISTANT CHLORINE-CONTAINING CROSSLINKED RESIN FORMED BODY AND ITS PRODUCTION METHOD, SILANE MASTERBATCH AND MASTERBATCH MIXTURE, AND HEAT-RESISTANT PRODUCT

CROSS-REFERENCE TO RELATED APPLICATIONS

This application is a Continuation of PCT International Application No. PCT/JP2018/010767 filed on Mar. 19, 2018, which claims priority under 35 U.S.C. § 119 (a) to Japanese Patent Application No. 2017-061904 filed in Japan on Mar. 27, 2017. Each of the above applications is hereby expressly incorporated by reference, in its entirety, into the present application.

TECHNICAL FIELD

The present invention relates to a heat-resistant chlorine-containing crosslinked resin formed body and its production method, a silane masterbatch and a masterbatch mixture, and a heat-resistant product.

BACKGROUND ART

Wiring materials, such as insulated wires, cables, cords, optical fiber core wires or optical fiber cords (i.e. optical fiber cables), to be used in an electrical or electronic equipment field and an industrial field, are required to have various characteristics, such as flame retardancy, heat resistance and mechanical strength (for example, tensile strength and tensile elongation).

As for the materials for forming a coating of the foregoing wiring materials, polyolefin resins, such as a polyethylene, are widely used.

In order to enhance heat resistance and the like of the wiring materials, it is effective to crosslink a polyolefin resin, thereby for forming the coating with a crosslinked product of the polyolefin resin. Examples of the method of crosslinking the polyolefin resin include: an electron beam crosslinking method of crosslinking it by electron beam irradiation; and a chemical crosslinking method, such as a crosslinking method of causing a crosslinking reaction due to decomposition of an organic peroxide or the like by applying heat after formation, or a silane crosslinking method.

Herein, the silane crosslinking method is a method of crosslinking a silane graft resin prepared by grafting thereto a silane coupling agent having an unsaturated group due to a grafting reaction, by bringing the above-described silane graft resin into contact with moisture in the presence of a silanol condensation catalyst.

Among the above-described crosslinking methods, because many of the silane crosslinking methods in particular do not need special equipment, it has a superior industrial manufacturing advantage over the other crosslinking methods.

As regards the silane crosslinking method of the polyolefin resin, Patent Literature 1 proposes a method of melt-mixing thoroughly an inorganic filler subjected to a surface treatment with a silane coupling agent; a silane coupling agent; an organic peroxide; and a crosslinking catalyst, into a polyolefin-based resin and a maleic anhydride-based resin, with using a kneader; and then forming the resultant mixture with a single-screw extruder.

CITATION LIST

Patent Literature

Patent Literature 1: JP-A-2001-101928 ("JP-A" means unexamined published Japanese patent application)

SUMMARY OF INVENTION

Technical Problem

In the silane crosslinking method described in Patent Literature 1, the polyolefin-based resin may crosslink in a melt-mixing with a kneader or the like in several cases. Further, a silane coupling agent other than the silane coupling agent engaged in the surface treatment of the inorganic filler may volatile, or a mutual condensation may occur, in several cases. Therefore, an objective silane graft resin may not be able to be prepared in several cases. Further, even if it could be prepared, a crosslinked formed body (or crosslinked coating) having a desired heat resistance may not be able to be obtained in several cases. Further, outer appearance of the crosslinked formed body may be also deteriorated in several cases, by a mutual condensation reaction of the silane coupling agents.

The above-described wiring materials are often wired in a wound state or in flection (or curved shape), and therefore flexibility enough to follow such wiring state is required for the wiring materials. If the flexibility is not enough, a conductor and a coating are separated from each other in a wiring work or thereafter. In some cases, this causes such problems that the wiring materials cannot be wound or curled to a predetermined state. On the other hand, conventional crosslinked formed bodies, which is obtained by silane crosslinking a polyolefin resin, are contemplated mainly to enhance heat resistance and the like, and the required performance was not severe until the flexibility.

As for the material of the wiring materials, besides the polyolefin resin, chlorine-containing resins, such as a chlorinated polyethylene resin, a polyvinyl chloride, or a chloroprene rubber, are also widely used from the viewpoint of its characteristics or performances. If a plasticizer is contained in a crosslinked formed body of such chlorine-containing resins, flexibility can be given to the crosslinked formed body. However, the mechanical strength thereof is lowered. Further, if the chlorine-containing resin is crosslinked in order to enhance heat resistance and the like, the flexibility tends to lower.

In a case of crosslinking such chlorine-containing resins, the chemical crosslinking method using organic peroxide or the electron beam crosslinking method has been adopted in the past. This is because it is more difficult to subject the chlorine-containing resin than the above-described polyolefin resin to the silane crosslinking with a silane crosslinking method. Even if a chlorine-containing resin, organic peroxide and a silane coupling agent having an unsaturated group are just simply provided in the above-described silane crosslinking method, any crosslinked formed body of the chlorine-containing resin cannot be obtained.

The silane crosslinking method providing high advantages as described above could not be applied to the crosslinking of the chlorine-containing resin.

The present invention is contemplated for solving the above-described problems, and for thereby providing a heat-resistant chlorine-containing crosslinked resin formed body having combined mechanical strength and flexibility; and for providing a method of producing the same.

Further, the present invention is contemplated for providing a silane masterbatch and a masterbatch mixture, each of which is able to form the forgoing heat-resistant chlorine-containing crosslinked resin formed body.

Further, the present invention is contemplated for providing a heat resistant product containing the above-described heat-resistant chlorine-containing crosslinked resin formed body.

Solution to Problem

The inventors of the present invention repeated studies on the silane crosslinking method, and have found that in carrying out a specific production method of mixing a silane masterbatch that was prepared by melt-mixing a base resin, an inorganic filler, and a silane coupling agent at a specific ratio, and a silanol condensation catalyst in a particular mixing aspect, if, as a base resin, a chlorinated polyethylene and a polyvinyl chloride and from 5% to 55% by mass of a plasticizer are used, to produce a heat-resistant chlorine-containing crosslinked resin formed body having balanced combination of mechanical strength and flexibility. The inventors of the present invention further repeated studies based on these findings and have completed the present invention.

The present invention is to provide the following means:
(1) A method of producing a heat-resistant chlorine-containing crosslinked resin formed body, formed from:
   (a) a step of melt-mixing, with respect to 100 parts by mass of a base resin containing a chlorinated polyethylene and a polyvinyl chloride and a plasticizer, from 0.003 to 0.3 parts by mass of an organic peroxide, from 0.5 to 400 parts by mass of an inorganic filler, and from more than 2 parts by mass to 15.0 parts by mass or less of a silane coupling agent having a grafting reaction site that is capable of causing a grafting reaction to the base resin, at a temperature equal to or higher than a decomposition temperature of the organic peroxide, thereby for subjecting the resultant mixture to the grafting reaction;
   (b) a step of mixing a silane masterbatch obtained in the step (a) and a silanol condensation catalyst, and then forming the mixture; and
   (c) a step of silane-crosslinking by bringing the resultant formed body obtained by the step (b) into contact with water;
   wherein, in the step (a), all or part of the base resin is used in the reaction of the base resin with the silane coupling agent, and from 5% to 55% by mass of the plasticizer are contained in 100% by mass of the base resin to be used in the reaction with the silane coupling agent.
(2) The method of producing a heat-resistant chlorine-containing crosslinked resin formed body as described in the item (1), wherein the plasticizer includes a phthalate ester-based plasticizer, a trimellitate ester-based plasticizer, a polyester-based plasticizer, an adipate ester-based plasticizer, or a pyromellitate-based plasticizer, or a combination thereof.
(3) The method of producing a heat-resistant chlorine-containing crosslinked resin formed body as described in the item (1) or (2), wherein the plasticizer includes a phthalate ester-based plasticizer or a trimellitate ester-based plasticizer, or a combination thereof.
(4) The method of producing a heat-resistant chlorine-containing crosslinked resin formed body as described in any one of the items (1) to (3), wherein from 5% to 40% by mass of the plasticizer is contained in 100% by mass of the base resin to be used in the reaction with the silane coupling agent.
(5) The method of producing a heat-resistant chlorine-containing crosslinked resin formed body as described in any one of the items (1) to (4), wherein part of the base resin is melt-mixed in the step (a), and the rest of the base resin is mixed in the step (b).
(6) The method of producing a heat-resistant chlorine-containing crosslinked resin formed body as described in any one of the items (1) to (5), wherein at least one of the melt-mixing in the step (a) and the mixing in the step (b) is carried out in the presence of hydrotalcite.
(7) The method of producing a heat-resistant chlorine-containing crosslinked resin formed body as described in any one of the items (1) to (6), wherein a ratio of content percentages of the chlorinated polyethylene and the polyvinyl chloride in the base resin to be used in the reaction with the silane coupling agent {(content percentage of chlorinated polyethylene):(content percentage of polyvinyl chloride)} is set to a range of from 95:5 to 10:90 by mass ratio.
(8) The method of producing a heat-resistant chlorine-containing crosslinked resin formed body as described in any one of the items (1) to (7), wherein the content of the organic peroxide is from 0.005 to 0.3 parts by mass.
(9) The method of producing a heat-resistant chlorine-containing crosslinked resin formed body as described in any one of the items (1) to (8), wherein the content of the silane coupling agent is from 3 to 12.0 parts by mass.
(10) The method of producing a heat-resistant chlorine-containing crosslinked resin formed body as described in any one of the items (1) to (9), wherein the content of the silane coupling agent is from 4 to 12.0 parts by mass.
(11) The method of producing a heat-resistant chlorine-containing crosslinked resin formed body as described in any one of the items (1) to (10), wherein the silane coupling agent includes vinyl trimethoxysilane or vinyl triethoxysilane.
(12) The method of producing a heat-resistant chlorine-containing crosslinked resin formed body as described in any one of the items (1) to (11), wherein the inorganic filler include hydrotalcite, silica, boehmite, clay, talc, aluminum hydroxide, magnesium hydroxide, or calcium carbonate, or a combination thereof.
(13) The method of producing a heat-resistant chlorine-containing crosslinked resin formed body as described in any one of the items (1) to (12), wherein the melt-mixing in the step (a) is carried out in a closed mixer.
(14) A silane masterbatch to be used to produce a masterbatch mixture formed by mixing, with respect to 100 parts by mass of a base resin containing a chlorinated polyethylene and a polyvinyl chloride and a plasticizer, from 0.003 to 0.3 parts by mass of an organic peroxide, from 0.5 to 400 parts by mass of an inorganic filler, from more than 2 parts by mass to 15.0 parts by mass or less of a silane coupling agent having a grafting reaction site that is capable of causing a grafting reaction to the base resin, and a silanol condensation catalyst,
   wherein the silane masterbatch contains from 5% to 55% by mass of the plasticizer in 100% by mass of all or part of the base resin, and is formed by melt-mixing all or part of the base resin, together with the organic peroxide, the inorganic filler, and the silane coupling agent at a temperature equal to or higher than a decomposition temperature of the organic peroxide, thereby for subjecting the resultant mixture to the graft reaction.

(15) A masterbatch mixture, containing the silane masterbatch as described in the item (14) and the silanol condensation catalyst.

(16) A heat-resistant chlorine-containing crosslinked resin formed body, comprising the masterbatch mixture as described in the item (15).

(17) A heat-resistant chlorine-containing crosslinked resin formed body, which is produced by the method of producing a heat-resistant chlorine-containing crosslinked resin formed body as described in any one of the items (1) to (13).

(18) The heat-resistant chlorine-containing crosslinked resin formed body as described in the item (17), wherein the base resin is crosslinked with the inorganic filler through a silanol bond.

(19) A heat-resistant chlorine-containing crosslinked resin formed body, including a cured product containing: a base resin-constituent including a chlorinated polyethylene and a polyvinyl chloride and from 5% to 50% by mass of a plasticizer; an inorganic filler-constituent; and a silane coupling agent-constituent, as each constituent,
wherein the content of the inorganic filler-constituent is from 0.5 to 400 parts by mass and the content of the silane coupling agent-constituent is more than 2 parts by mass and 15.0 parts by mass or less, respectively, with respect to 100 parts by mass of the base resin-constituent, and
wherein the cured product contains: an inorganic filler-cured product formed by binding the chlorinated polyethylene-constituent or the polyvinyl chloride-constituent and the inorganic filler-constituent through the silane coupling agent-constituent; and a chlorine-containing resin-cured product formed by crosslinking the chlorinated polyethylene-constituent or the polyvinyl chloride-constituent by the silane coupling agent-constituent.

(20) A heat resistant product, containing the heat-resistant chlorine-containing crosslinked resin formed body as described in any one of the items (16) to (19).

(21) The heat resistant product as described in the item (20), wherein the heat-resistant chlorine-containing crosslinked resin formed body is a coating of an electric wire or an optical fiber cable.

Note that, in this specification, numerical expressions in a style of " . . . to . . . " will be used to indicate a range including the lower and upper limits represented by the numerals given before and after "to", respectively.

Effects of Invention

According to the present invention, there can be provided: a heat-resistant chlorine-containing crosslinked resin formed body having combined mechanical strength and flexibility; and its production method. Further, according to the present invention, there can be provided: a silane masterbatch; and a masterbatch mixture, each of which is able to form the forgoing heat-resistant chlorine-containing crosslinked resin formed body. Furthermore, there can be provided a heat resistant product, containing the above-described heat-resistant chlorine-containing crosslinked resin formed body.

Other and further features and advantages of the invention will appear more fully from the following description.

MODE FOR CARRYING OUT THE INVENTION

First, each component to be used in the present invention will be explained.

<Base Resin>

The base resin to be used in the present invention contains a chlorinated polyethylene and a polyvinyl chloride, of the chlorine-containing resin. As for these resins, use can be made of a polymeric resin having, at the main chain or the end thereof, a site that is capable of causing a grafting reaction with a site of the silane coupling agent that is capable of causing a grafting reaction (e.g. referred to as a grafting reaction site) in the presence of radicals occurred from an organic peroxide described below. Examples of the site that is capable of causing a graft reaction include an unsaturated binding site of the carbon chain and a carbon atom having a hydrogen atom. If a chlorinated polyethylene and a polyvinyl chloride are contained as a base resin, even if a plasticizer is contained at a content percentage described below, it can be applied to the silane crosslinking method in the present invention. As a result, these chlorine-containing resins can be subjected to the silane crosslinking, whereby excellent heat resistance can be given to the heat-resistant chlorine-containing crosslinked resin formed body thus obtained. In addition, mechanical strength and flexibility can be given thereto in a balanced manner. Further, there can be also given thereto, preferably, oil resistance or weather resistance, which is exerted, and outer appearance or cold resistance (for example, characteristics that crack or fracture is hard to occur under the cold environment; and characteristics including abrasion resistance, and the like).

Chlorinated polyethylene is not particularly limited, as long as the chlorinated polyethylene is polyethylene in which a hydrogen atom bonded to a polyethylene main chain is replaced by a chlorine atom, and specific examples thereof include one obtained by chlorinating an ethylene (co)polymer. As the chlorinated polyethylene, one having a chlorine content of 20% by mass or more is preferable, one having a chlorine content of 25% by mass or more is more preferable, and one having a chlorine content of 30% by mass or more is further preferable. If the chlorine content is high, it can be made into a heat-resistant chlorine-containing crosslinked resin formed body exerting more excellent rubber-like elasticity (or flexibility). Further, the heat-resistant chlorine-containing crosslinked resin formed body is also excellent in oil resistance and weather resistance. An upper limit of a chlorine percentage content is a mass ratio when all of hydrogen atoms of polyethylene before being chlorinated, and capable of being replaced by a chlorine atom are replaced by the chlorine atom, and is unable to be unambiguously determined by a molecular weight of polyethylene before being chlorinated, the number of hydrogen atoms capable of being replaced by the chlorine atom, or the like. For example, the upper limit is about 75% by mass. The chlorine content means a mass ratio of the chlorine atom to a total amount of chlorinated polyethylene, and can be quantitatively determined according to potentiometric titration described in JIS K 7229.

Polyvinyl chloride is not particularly limited, as long as the polyvinyl chloride is a polymer (or homopolymer or copolymer) of vinyl chloride.

By using the chlorinated polyethylene and the polyvinyl chloride in combination, even if the content of the silane coupling agent is increased, extrusion appearance characteristics of the heat-resistant chlorine-containing crosslinked resin formed body can be maintained. Therefore, it becomes possible to obtain a heat-resistant chlorine-containing crosslinked resin formed body having an excellent appearance.

The molecular weight of the polyvinyl chloride is not particularly limited, and preferably from 400 to 3,000, more preferably from 700 to 2,600, and still more preferably from 700 to 1,500. If the molecular weight is from 400 to 3,000, a strong strength can be given to the heat-resistant chlorine-containing crosslinked resin formed body. Furthermore, the formed appearance becomes excellent, and oil resistance can be given to the formed body.

In the present invention, as part or all of the polyvinyl chloride, use may be also made of: a copolymer of the polyvinyl chloride and other polymer.

In the present invention, the base resin further contains a specific amount of the plasticizer. By using the chlorinated polyethylene and the polyvinyl chloride and the plasticizer in combination in the silane crosslinking method in the present invention, a heat-resistant chlorine-containing crosslinked resin formed body exerting high flexibility can be obtained without deteriorating strength.

As for the plasticizer, various kinds of plasticizers to be ordinarily used for chlorine-containing resins may be used without any particular limitation. Examples thereof include: a low-molecular plasticizer such as a phthalate ester-based plasticizer, a trimellitate ester-based plasticizer (preferably trialkyl- (the number of carbon atoms of the alkyl group is from 8 to 10) trimellitate), an adipate ester-based plasticizer, and a pyromellitate-based plasticizer; and a high-molecular plasticizer, such a polyester-based plasticizer, a vinyl acetate-based copolymer, and a (meth)acrylate ester copolymer.

Above all, from the viewpoint of suppressing an extrusion load, a low-molecular plasticizer is preferred. From the plasticizing effect, a phthalate ester-based plasticizer, a trimellitate ester-based plasticizer, a polyester-based plasticizer, an adipate ester-based plasticizer, or a pyromellitate-based plasticizer, or a combination thereof is more preferred. From the viewpoint of the plasticizing effect and crosslinking stability, a phthalate ester-based plasticizer or a trimellitate ester-based plasticizer, or a combination thereof is furthermore preferred.

The plasticizer in the present invention may be used alone or in combination of 2 or more.

In the present invention, the base resin may contain further other resins.

The other resin is not particularly limited, as long as it is other than the chlorinated polyethylene and the polyvinyl chloride. However, from the viewpoint of compatibility, polyurethane, an ethylene vinyl acetate copolymer, an ethylene alkyl acid ester copolymer, polystyrene, a polystyrene-based elastomer, polyester, a polyester-based elastomer and the like are preferred. Besides, the base resin may contain further various kinds of resins, as long as the effects of the present invention are not impaired.

In the base resin (in a case of using a carrier resin described below, the base resin contain the carrier resin), the content percentage of each component is determined properly so that a total of content percentages of a chlorinated polyethylene, a polyvinyl chloride, and a plasticizer, and further other resin contained by necessity gets to 100% by mass, and is preferably selected from the following ranges.

The content percentage of the plasticizer in the base resin is not particularly limited, as long as it satisfies a specific amount described below at the time of reaction between the above-described silane coupling agent and the base resin component. For example, the content percentage is preferably from 5% to 55% by mass, more preferably from 5% to 50% by mass, furthermore preferably from 5% to 40% by mass, still more preferably from more than 15% by mass to 40% by mass, and particularly preferably from 20% to 40% by mass. By using a specific amount of the plasticizer, mechanical strength and flexibility can be given to the heat-resistant chlorine-containing crosslinked resin formed body.

It is preferable that the content percentage of the plasticizer satisfies the above range and is equal to or less than the content percentage of the polyvinyl chloride.

Although the content percentage of the chlorinated polyethylene in the base resin is not particularly limited, it is preferably from 10% to 90% by mass, more preferably from 15% to 85% by mass, and still more preferably from 20% to 85% by mass. If the content percentage of the chlorinated polyethylene is from 10% to 90% by mass, this results in excellent heat resistance. Further, this also results in excellent appearance of the heat-resistant chlorine-containing crosslinked resin formed body. Further, flame retardancy, oil resistance, or weather resistance and the like, each of which is originated from the chlorinated polyethylene, can be given thereto.

Although the content percentage of the polyvinyl chloride in the base resin is not particularly limited, it is preferably from 3% to 80% by mass, more preferably from 15% to 65% by mass, and still more preferably from 25% to 60% by mass. If the content percentage of the polyvinyl chloride is from 3% to 80% by mass, a chlorine-containing resin can be subjected to the silane crosslinking, so that a heat-resistant chlorine-containing crosslinked resin formed body having excellent heat resistance can be obtained. Further, it is possible to make the heat-resistant chlorine-containing crosslinked resin formed body excellent in tensile elongation. The upper limit of the content percentage of the polyvinyl chloride is more preferably 75% by mass or less and particularly preferably 60% by mass or less from the viewpoints of heat resistance and appearance, and further most preferably 50% by mass or less from the viewpoints of heat resistance, appearance and oil resistance.

In the present invention, the content percentage of the polyvinyl chloride is set in the above-described range. However, in detail, the forgoing content percentage can be divided into a low content percentage aspect of preferably from 3% to 45% by mass and a high content percentage aspect of preferably from more than 45% by mass to 80% by mass. In the low content percentage aspect, from the above-described reason, a range of 10% to 45% by mass is more preferable and a range of 15% to 45% by mass is furthermore preferable. In the high content percentage aspect, from the above-described reason, a range of more than 45% by mass and 75% by mass or less is more preferable and a range of more than 45% by mass and 65% by mass or less is furthermore preferable. Further, as the upper limit of this aspect, the above-described upper limit can be also adopted.

Although the content percentage of the other resin is not particularly limited, it is preferably from 0% to 45% by mass, and more preferably from 0% to 25% by mass.

<Organic Peroxide>

The organic peroxide plays a role of generating a radical at least by thermal decomposition, to cause a grafting reaction (a binding reaction between a grafting reaction site of the silane coupling agent and a site of the base resin that is capable of causing the grafting reaction therewith) due to the radical reaction of the silane coupling agent onto the resin component, as a catalyst. In particular, when the reaction site of the silane coupling agent contains, for example, an ethylenically unsaturated group, the organic peroxide play a role of causing the grafting reaction due to a radical reaction (including an abstraction reaction of a hydrogen radical from the resin component) between the ethylenically unsaturated group and the resin component.

The organic peroxide is not particularly limited, as long as the organic peroxide is one that generates a radical. Ordinary ones can be used. For example, as the organic peroxide, the compound represented by the formula $R^1$—OO—$R^2$, $R^3$—OO—C(=O)$R^4$, or $R^5$C(=O)—OO(C=O)$R^6$ is preferable. Herein, $R^1$ to $R^6$ each independently represent an alkyl group, an aryl group, or an acyl group. Among $R^1$ to $R^6$ of each compound, it is preferable that all of $R^1$ to $R^6$ be an alkyl group, or that any one of them be an alkyl group and the rest be an acyl group.

Examples of such organic peroxide may include dicumyl peroxide (DCP), di-tert-butyl peroxide, 2,5-dimethyl-2,5-di-(tert-butyl peroxy)hexane, 2,5-dimethyl-2,5-di(tert-butyl peroxy)hexyne-3, 1,3-bis(tert-butyl peroxyisopropyl)benzene, 1,1-bis(tert-butyl peroxy)-3,3,5-trimethylcyclohexane, n-butyl-4,4-bis(tert-butyl peroxy)valerate, benzoyl peroxide, p-chlorobenzoyl peroxide, 2,4-dichlorobenzoyl peroxide, tert-butyl peroxybenzoate, tert-butyl peroxyisopropyl carbonate, diacetyl peroxide, lauroyl peroxide, tert-butylcumyl peroxide and the like. Among them, dicumyl peroxide, 2,5-dimethyl-2,5-di-(tert-butyl peroxy)hexane, or 2,5-dimethyl-2,5-di-(tert-butyl peroxy)hexyne-3 is preferable, from the standpoint of odor, coloration, and scorch stability.

The decomposition temperature of the organic peroxide is preferably 80 to 195° C., and more preferably 125 to 180° C.

For the present invention, the decomposition temperature of the organic peroxide means the temperature, at which, when an organic peroxide having a single composition is heated, the organic peroxide itself causes a decomposition reaction and decomposes into two or more kinds of compounds at a certain temperature or temperature range. In specific, the decomposition temperature is a temperature at which heat absorption or heat generation starts, when the organic peroxide is heated from a room temperature in a heating rate of 5° C./min under a nitrogen gas atmosphere, by a thermal analysis such as a DSC method.

<Inorganic Filler>

In the present invention, the inorganic filler can be used without particular limitation, as long as the inorganic filler has, on a surface thereof, a site with which the inorganic filler can be chemically bonded to a reaction site, such as a silanol group or the like, of the silane coupling agent, by hydrogen bonding, covalent bonding or the like, or intermolecular bonding. For the inorganic filler, examples of the site that can be chemically bonded with the reaction site of the silane coupling agent may include an OH group (OH group of hydroxy group, of water molecule in hydrous substance or crystallized water, or of carboxyl group), amino group, a SH group, and the like.

As such an inorganic filler, though not limited to these, use can be made of metal hydrate, such as a compound having a hydroxy group or crystallized water, for example, aluminum hydroxide, magnesium hydroxide, calcium carbonate, magnesium carbonate, calcium silicate, magnesium silicate, calcium oxide, magnesium oxide, aluminum oxide (preferably boehmite), aluminum nitride, aluminum borate whisker, hydrated aluminum silicate, hydrated magnesium silicate, basic magnesium carbonate, hydrotalcite, and talc. Further, use can be made of boron nitride, silica (crystalline silica, amorphous silica, and the like), carbon, clay, zinc oxide, tin oxide, titanium oxide, molybdenum oxide, antimony trioxide, a silicone compound, quartz, zinc borate, white carbon, zinc borate, zinc hydroxystannate, or zinc stannate.

As the inorganic filler, a surface-treated inorganic filler, surface-treated with a silane coupling agent or the like can be used. Specific examples of silane-coupling-agent-surface-treated inorganic filler include KISUMA 5L and KISUMA 5P (both trade names, magnesium hydroxide, manufactured by Kyowa Chemical Industry Co., Ltd.) or the like. The amount of surface treatment of the inorganic filler with a silane coupling agent is not particularly limited, but is 3 mass % or less, for example.

Among these inorganic fillers, hydrotalcite, silica, boehmite, clay, talc, aluminum hydroxide, magnesium hydroxide, or calcium carbonate, or any combination of these is preferable.

The inorganic filler may be used singly alone, or in combination of two or more kinds thereof.

When the inorganic fillers is in a powder form, the inorganic filler has an average particle diameter of preferably 0.2 to 10 μm, more preferably 0.3 to 8 μm, further preferably 0.4 to 5 μm, and particularly preferably 0.4 to 3 μm. If the average particle diameter is within the above-described range, a silane coupling agent holding effect is high, to provide the product having excellent heat resistance. In addition, the inorganic filler is hard to cause secondary aggregation in mixing with the silane coupling agent, to provide the product having excellent appearance. The average particle diameter is obtained by dispersing the inorganic filler in alcohol or water, and then measuring using an optical particle diameter measuring device such as a laser diffraction/scattering particle diameter distribution measuring device.

<Silane Coupling Agent>

The silane coupling agent to be used in the present invention may be an agent at least having a grafting reaction site (a group or an atom) having a capability of being graft reacted onto the base resin, especially the chlorine-containing resin, in the presence of a radical occurred by decomposition of the organic peroxide, and a reaction site (including a moiety formed by hydrolysis: for example, a silyl ester group or the like) having both a capability of being silanol condensed, and a capability of reacting with the site having a capability of being chemically bonded in the inorganic filler. Specific examples of such a silane coupling agent include a silane coupling agent that has been used so far in the silane crosslinking method.

As such a silane coupling agent, for example, a compound represented by the following Formula (1) can be used.

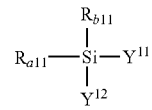

Formula (1)

In formula (1), $R_{a11}$ represents a group having an ethylenically unsaturated group, $R_{b11}$ represents an aliphatic hydrocarbon group, a hydrogen atom, or $Y^{13}$. $Y^{11}$, $Y^{12}$, and $Y^{13}$ each represent a hydrolyzable organic group. $Y^{11}$, $Y^{12}$, and $Y^{13}$ may be the same or different from each other.

$R_{a11}$ is a grafting reaction site, and is preferably a group containing an ethylenically unsaturated group. Specific examples of the group containing the ethylenically unsaturated group include a vinyl group, a (meth)acryloyloxyalkylene group and a p-styryl group. Among them, a vinyl group is preferable.

$R_{b11}$ represents an aliphatic hydrocarbon group, a hydrogen atom, or $Y^{13}$ to be described below, and example of the aliphatic hydrocarbon group may include a monovalent aliphatic hydrocarbon group having 1 to 8 carbon atoms other than an aliphatic unsaturated hydrocarbon group. $R_{b11}$ preferably represents $Y^{13}$ to be described below.

$Y^{11}$, $Y^{12}$, and $Y^{13}$ each independently represent a reaction site capable of causing silanol condensation (a hydrolyzable organic group). Examples thereof may include an alkoxy group having 1 to 6 carbon atoms, an aryloxy group having 6 to 10 carbon atoms, and an acyloxy group having 1 to 4 carbon atoms, and an alkoxy group is preferable. Specific examples of the hydrolyzable organic group may include methoxy, ethoxy, butoxy, and acyloxy. Among them, from the standpoint of the reactivity of the silane coupling agent, methoxy or ethoxy is preferable.

As the silane coupling agent, a silane coupling agent that has high hydrolysis rate is preferable, a silane coupling agent in which $R_{b11}$ is $Y^{13}$ and also $Y^{11}$, $Y^{12}$, and $Y^{13}$ are the same each other, or a silane coupling agent in which at least one of $Y^{11}$, $Y^{12}$, and $Y^{13}$ is a methoxy group, is more preferable.

Specific examples of the silane coupling agent include vinylsilanes such as vinyltrimethoxysilane, vinyltriethoxysilane, vinyltributoxysilane, vinyldimethoxyethoxysilane, vinyldimethoxybutoxysilane, vinyldiethoxybutoxysilane, allyltrimethoxysilane, allyltriethoxysilane, and vinyltriacetoxysilane, and (meth)acryloxysilanes such as methacryloxypropyltrimethoxysilane, methacryloxypropyltriethoxysilane, and methacryloxypropylmethyldimethoxysilane.

Among the silane coupling agents, the silane coupling agent having a vinyl group and an alkoxy group at an end is more preferable, and vinyltrimethoxysilane or vinyltriethoxysilane is particularly preferable.

The silane coupling agent may be used singly, or in combination of two or more kinds thereof. Further, the silane coupling agent may be used as it is, or may be diluted with a solvent and used.

<Silanol Condensation Catalyst>

The silanol condensation catalyst has an action of binding the silane coupling agents which have been grafted onto the base resin to each other, by a condensation reaction, in the presence of water. Based on the action of the silanol condensation catalyst, the base resin are crosslinked between themselves through silane coupling agent. As a result, the heat-resistant chlorine-containing crosslinked resin formed body having excellent heat resistance can be obtained.

Examples of the silanol condensation catalyst to be used in the present invention include an organic tin compound, a metal soap, a platinum compound, and the like. Usual examples of the silanol condensation catalyst may include dibutyltin dilaurate, dioctyltin dilaurate, dibutyltin dioctylate, dibutyltin diacetate, zinc stearate, lead stearate, barium stearate, calcium stearate, sodium stearate, lead naphthenate, lead sulfate, zinc sulfate, an organic platinum compound, and the like. Among these, organic tin compounds such as dibutyltin dilaurate, dioctyltin dilaurate, dibutyltin dioctylate, and dibutyltin diacetate are particularly preferable.

<Carrier Resin>

A silanol condensation catalyst is used, if desired, in a form mixed with a resin. Such a resin (also referred to as a carrier resin) is not particularly limited, and each resin component or rubber component described in the base resin can be used.

The carrier resin preferably contains one kind or two or more kinds of resin components to be used in the silane masterbatch, in considering compatibility with the silane masterbatch.

<Additive>

To the heat-resistant chlorine-containing crosslinked resin formed body and the like, various additives which are usually used for electric wires, electric cables, electric cords, sheets, foams, tubes, and pipes, may be properly used in the range that does not adversely affect the effects exhibited by the present invention. Examples of these additives include a crosslinking assistant, an antioxidant, a lubricant, a metal inactivator, a filling agent (including a flame retardant and a flame retardant aid), and the like.

The crosslinking assistant refers to one that forms a partial crosslinking structure with the base resin component, in the presence of the organic peroxide. Examples thereof may include polyfunctional compounds, for example, a (meth)acrylate compound such as polypropyleneglycol diacrylate and trimethylolpropane triacrylate, an allyl compound such as triallyl cyanurate; a maleimide compound, or a divinyl compound.

The antioxidant is not particularly limited, but, for example, an amine-based antioxidant, a phenol-based antioxidant, sulfur-based antioxidant, and the like can be used. Examples of the amine-based antioxidant include 4,4'-dioctyl-diphenylamine, N,N'-diphenyl-p-phenylenediamine, 2,2,4-trimethyl-1,2-dihydroquinoline polymer; and the like. Examples of the phenol-based antioxidant include pentaerythritol-tetrakis(3-(3,5-di-tert-butyl-4-hydroxyphenyl) propionate), octadecyl-3-(3,5-di-tert-butyl-4-hydroxyphenyl)propionate, 1,3,5-trimethyl-2,4,6-tris(3,5-di-tert-butyl-4-hydroxybenzyl)benzene; and the like. Examples of the sulfur-based antioxidant include bis(2-methyl-4-(3-n-alkylthiopropionyloxy)-5-tert-butylphenyl)sulfide, 2-mercaptobenzimidazole and zinc salts thereof, and pentaerythritol-tetrakis(3-lauryl-thiopropionate). The antioxidant is preferably included in a content of 0.1 to 15.0 parts by mass, and more preferably included in a content of 0.1 to 10 parts by mass, with respect to 100 parts by mass of the base resin.

Examples of the metal inactivator may include N,N'-bis(3-(3,5-di-tert-butyl-4-hydroxyphenyl)propionyl)hydrazine, 3-(N-salicyloyl)amino-1,2,4-triazole, and 2,2'-oxamidebis (ethyl-3-(3,5-di-tert-butyl-4-hydroxyphenyl)propionate).

Specific examples of the flame retardant (flame retardant aid) or the filler include carbon, clay, zinc oxide, tin oxide, titanium oxide, magnesium oxide, molybdenum oxide, antimony trioxide, a silicone compound, quartz, talc, calcium carbonate, magnesium carbonate, zinc borate and white carbon. These filling agents may be used as the filler, in mixing the silane coupling agent, or may be added to the carrier resin.

Examples of the lubricant may include hydrocarbon-based, siloxane-based, fatty-acid-based, fatty-acid-amide-based, ester-based, alcohol-based, or metal-soap-based lubricants. These lubricants should be added to the carrier resin.

<Method for Producing Heat-Resistant Chlorine-Containing Crosslinked Resin Formed Body>

Next, the production method of the present invention is specifically described.

In the method for producing the heat-resistant chlorine-containing crosslinked resin formed body of the present invention, the following step (a) to step (c) are performed.

The silane masterbatch according to the present invention is produced through the following step (a), and the masterbatch mixture according to the present invention is produced through the following step (a) and step (b).

Step (a): a step of melt-mixing (also referred to as melt-kneading or kneading), with respect to 100 parts by mass of a base resin containing a chlorinated polyethylene and a polyvinyl chloride and a plasticizer, from 0.003 to 0.3 parts by mass of an organic peroxide, from 0.5 to 400 parts by mass of an inorganic filler, and from more than 2 parts by mass to 15.0 parts by mass or less of a silane coupling agent having a grafting reaction site that is capable of causing the grafting reaction to the base resin, at a temperature equal to or higher than a decomposition temperature of the organic peroxide, thereby for subjecting the resultant mixture to the above-described grafting reaction;

Step (b): a step of mixing a silane masterbatch obtained in the step (a) and a silanol condensation catalyst, and then forming the mixture; and Step (c): a step of subjecting the formed body obtained in the step (b) to silane-crosslinking by bringing it into contact with water.

In the step (a), all or part of the base resin is used in the reaction of the base resin (grafting reaction site) with the silane coupling agent, and from 5% to 55% by mass of a plasticizer are contained in 100% by mass of the base resin to be used in the reaction with the silane coupling agent.

Herein, the expression "to mix" means to obtain a homogeneous mixture.

The content percentage of the plasticizer in 100% by mass of (the above-described all or part of) the base resin to be used in the time of reaction with the above-described silane coupling agent (that is, in all amount of the base resin to be used in the step (a)) is preferably from 5% to 50% by mass, furthermore preferably from 5% to 40% by mass, still more preferably from 15% to 40% by mass, and particularly preferably from 20% to 40% by mass. If the content percentage of the plasticizer is too low, a sufficient flexibility cannot be given, so that the flexibility may not be compatible with strength in several cases. Further, cold resistance of the heat-resistant chlorine-containing crosslinked resin formed body tends to lower. If the content percentage of the plasticizer is too high, strength of the heat-resistant chlorine-containing crosslinked resin formed body lowers, so that the strength may not be compatible with flexibility in several cases.

The ratio of content percentages of the chlorinated polyethylene and the polyvinyl chloride in the base resin to be used in the reaction with the above-described silane coupling agent (content percentage of chlorinated polyethylene: content percentage of polyvinyl chloride) is preferably from 95:5 to 10:90, preferably from 85:15 to 15:85, furthermore preferably from 80:20 to 30:70, by mass ratio, assuming that a total of the content percentage of the chlorinated polyethylene and the content percentage of the polyvinyl chloride is 100. If the above-described ratio of content percentages is from 95:5 to 10:90, the base resin can be crosslinked, thereby getting excellent heat resistance. Further, there can be obtained the heat-resistant chlorine-containing crosslinked resin formed body exerting excellent tensile elongation.

In the step (a), a blending amount of the organic peroxide is 0.003 to 0.3 parts by mass, preferably 0.005 to 0.3 parts by mass, and more preferably 0.005 to 0.1 parts by mass, with respect to 100 parts by mass of the base resin. If the blending amount of the organic peroxide is less than 0.003 parts by mass, a grafting reaction of the silane coupling agent does not proceed, and unreacted silane coupling agents condense with each other or the unreacted silane coupling agent volatilizes, so that heat resistance or strength may not be able to be obtained sufficiently in several cases. On the other hand, if the blending amount thereof is over 0.3 parts by mass, the resin component is directly crosslinked by a side reaction. Therefore, flexibility lowers. Further, it may be inferior to mechanical strength in several cases. Further, crosslinked resin components form a dimple (or foreign matters), so that poor appearance may occur in the heat-resistant chlorine-containing crosslinked resin formed body in several cases. Further, a silane masterbatch and the like exerting an excellent extrusion performance may not be obtained in several cases. That is, by adjusting the blending amount of the organic peroxide to the forgoing range, a grafting reaction can be carried out in a proper range, so that flexibility can be given sufficiently to the heat-resistant chlorine-containing crosslinked resin formed body. Furthermore, the silane masterbatch and the like exerting an excellent extrusion performance can be obtained, even without occurrence of a dimple.

The blending amount of the inorganic filler is 0.5 to 400 parts by mass, and preferably 30 to 280 parts by mass, with respect to 100 parts by mass of the base resin. If the blending amount of the inorganic filler is less than 0.5 parts by mass, the grafting reaction of the silane coupling agent becomes heterogeneous, so that excellent heat resistance or strength may not be able to be given to the heat-resistant chlorine-containing crosslinked resin formed body in several cases. Further, the appearance of the heat-resistant chlorine-containing crosslinked resin formed body may be reduced in several cases. On the other hand, if the blending amount of the inorganic filler is over 400 parts by mass, the heat resistance and further even the appearance may be reduced in several cases. Further, the load at the time of forming or melt-mixing becomes very large, so that a secondary formation may become difficult in several cases.

The blending amount of the silane coupling agent is more than 2.0 parts by mass and 15.0 parts by mass or less, with respect to 100 parts by mass of the base resin. If the blending amount of the silane coupling agent is 2.0 parts by mass or less, the crosslinking reaction does not progress sufficiently, and the excellent heat resistance or mechanical strength is not exhibited in several cases. In addition, in forming together with the silanol condensation catalyst, poor appearance or the aggregated substance is occurred, and when an extruder is stopped, a large number of aggregated substances are occurred, in several cases. On the other hand, if the blending amount is over 15.0 parts by mass, the silane coupling agent is unable to be farther adsorbed on the inorganic filler surfaces, and the silane coupling agent is volatilized in melt-mixing, and such a case is not economical. In addition, the silane coupling agent that is not adsorbed causes condensation, and a crosslinked gel or aggregated substance or a burn is occurred in the formed body, and the appearance is liable to be deteriorated.

From the above-described viewpoints, the blending amount of the silane coupling agent is preferably 3 to 12.0 parts by mass, and more preferably 4 to 12.0 parts by mass, with respect to 100 parts by mass of the base resin.

From the viewpoint of tensile elongation, from 0.05 to 0.4 parts by mass of the organic peroxide and from 3 to 8 parts by mass of the silane coupling agent are preferable.

From the viewpoint of outer extrusion appearance, from 0.05 to 0.2 parts by mass of the organic peroxide and from 3 to 12 parts by mass of the silane coupling agent are preferable.

The blending amount of the silanol condensation catalyst is not particularly limited and is preferably from 0.0001 to 0.5 parts by mass and more preferably from 0.001 to 0.2 parts by mass, with respect to 100 parts by mass of the base resin. If the blending amount of the silanol condensation catalyst is from 0.0001 to 0.5 parts by mass, a crosslinking reaction due to condensation reaction of the silane coupling agent tends to proceed almost uniformly, so that the heat-resistant chlorine-containing crosslinked resin formed body exhibits excellent heat resistance, appearance and physical properties, and productivity is also improved. That is, if the blending amount of the silanol condensation catalyst is too low, the crosslink due to the condensation reaction of the silane coupling agent becomes difficult to proceed, so that the productivity may lower without enhancing the heat resistance of the heat-resistant chlorine-containing crosslinked resin formed body in several cases. Further, the crosslink may become heterogeneous in several cases. On the other hand, if the blending amount is too high, the flexibility and the like of the heat-resistant chlorine-containing crosslinked resin formed body (resin) may be reduced in several cases. Further, the silanol condensation reaction may proceed very quickly, so that a partial gelation occurs, which results in reduction of the appearance in several cases.

In the present invention, an expression "melt-mixing the base resin, the organic peroxide, the inorganic filler and the silane coupling agent" does not specify the mixing order in melt-mixing, and means that such materials may be mixed in any order. The mixing order in the step (a) is not particularly limited. In the present invention, the inorganic filler is preferably mixed with the silane coupling agent and used. That is, in the present invention, each component described above is preferably (melt-)mixed through the following steps (a-1) and (a-2).

Step (a-1): a step of mixing at least the inorganic filler and the silane coupling agent, to prepare a mixture.

Step (a-2): a step of melt-mixing the mixture obtained in the step (a-1) with all or part of the base resin, in the presence of the organic peroxide, at a temperature equal to or higher than a decomposition temperature of the organic peroxide.

In the above-described step (a-2), the present invention includes "an aspect in which a total amount (100 parts by mass) of the base resin is blended" and "an aspect in which part of the base resin is blended". When part of the base resin is blended in the step (a-2), a remainder of the base resin is preferably blended in the step (b).

When part of the base resin is blended in the step (a-2), 100 parts by mass in the blending amount of the base resin in the step (a) and the step (b) are a total amount of the base resin to be mixed in the step (a-2) and the step (b).

Here, when the remainder of the base resin is blended in the step (b), the base resin is blended preferably in an amount of 55% to 99% by mass, and more preferably in an amount of 60% to 95% by mass in the step (a-2), and is blended preferably in an amount of 1% to 45% by mass, and more preferably in an amount of 5% to 40% by mass in the step (b).

When part of the base resin is blended in the step (a-2), the plasticizer is blended so that the content percentage of the plasticizer in the base resin to be used in the step (a-2) satisfies a range of 5% to 55% by mass. Further, the plasticize may be also contained in the rest of the base resin to be used in the step (b), as long as the plasticizer is blended in the step (a-2) so that it satisfies the above-described content percentage.

In the present invention, as described above, the silane coupling agent is preferably pre-mixed or the like with the inorganic filler (step (a-1)).

The method of mixing the inorganic filler and the silane coupling agent is not particularly limited, and mixing methods such as wet treatment and dry treatment can be mentioned. Specific examples thereof include wet treatment in which a silane coupling agent is added in a solvent such as alcohol and water in a state in which an inorganic filler is dispersed, dry treatment in which the silane coupling agent is added and mixed, under heating or non-heating, to an untreated inorganic filler or to an inorganic filler preliminary subjected to surface treatment with stearic acid, oleic acid, phosphate or partially with the silane coupling agent, and both of these treatments. In the present invention, a dry treatment is preferable in which the silane coupling agent is added to the inorganic filler, preferably a dried inorganic filler, and mixed under heating or non-heating.

The pre-mixed silane coupling agent exists in such a manner of surrounding the surface of the inorganic filler, and a part or a whole thereof is adsorbed or bonded on the inorganic filler. In this manner, it becomes possible to suppress the volatilization of the silane coupling agent in the subsequent melt-mixing. Further, it is also possible to prevent the condensation among the silane coupling agents that are not adsorbed or bonded on the inorganic fillers, which makes melt-blending difficult. Furthermore, a desired shape can be obtained upon extrusion forming.

Specific examples of such a mixing method include a method in which an inorganic filler and a silane coupling agent are preferably mixed (dispersed) according to a dry method or a wet method at a temperature lower than a decomposition temperature of the organic peroxide, preferably at room temperature (25° C.), for about several minutes to several hours, and then this mixture and the resin are melt-mixed in the presence of the organic peroxide. This mixing is preferably performed by a mixer type mixing machine such as a Banbury mixer and a kneader. In this manner, an excessive crosslinking reaction between the resin components can be prevented, to provide the product having excellent appearance.

In this mixing method, the resin may exist as long as the above-described temperature lower than the decomposition temperature is kept. In this case, it is preferable to mix metal oxide and the silane coupling agent together with the resin at the above-described temperature (step (a-1)), and then melt-mix the resultant material.

A method of mixing the organic peroxide is not particularly limited, and the organic peroxide only needs to exist in melt-mixing the above-described mixture and the base resin. The organic peroxide may be mixed, for example, simultaneously with the inorganic filler and the like, or may be mixed in any of stages of mixing the inorganic filer and the silane coupling agent, or may be mixed with a mixture of the inorganic filler and the silane coupling agent. For example, the organic peroxide may be mixed with the inorganic filler after the organic peroxide is mixed with the silane coupling agent, or may be mixed with the inorganic filler separately from the silane coupling agent. Only the silane coupling agent may be mixed with the inorganic filler, and then the organic peroxide may be mixed, depending on production conditions.

In addition, the organic peroxide may be a material mixed with any other component or a single body.

In the method of mixing the inorganic filler and the silane coupling agent, bonding force between the silane coupling agent and the inorganic filler is strong in wet mixing, and therefore volatilization of the silane coupling agent can be effectively suppressed, but the silanol condensation reaction becomes hard to progress in several cases. On the other hand, the silane coupling agent is easily volatilized in dry mixing, but the bonding force between the inorganic filler and the silane coupling agent is comparatively weak, and therefore the silanol condensation reaction becomes easy to progress efficiently.

In the production method of the present invention, the obtained mixture, all or part of the base resin, and the remaining component(s) that is not mixed in the step (a-1) are then melt-kneaded in the presence of the organic peroxide while the mixture is heated to the temperature equal to or higher than the decomposition temperature of the organic peroxide (step (a-2)).

In the step (a-2), the temperature at which the above-described component are melt-mixed is equal to or higher than the decomposition temperature of the organic peroxide, preferably a temperature of the decomposition temperature of the organic peroxide plus (25 to 110)° C. This decomposition temperature is preferably set after the resin components are melted. If the above-described mixing temperature is applied, the above-described components are melted, and the organic peroxide is decomposed and acts thereon, and a required silane grafting reaction sufficiently progresses in the step (a-2). Other conditions, for example, a mixing time can be appropriately set.

A mixing method is not particularly limited, as long as the mixing method is a method ordinarily applied for rubber, plastic or the like. A mixing device may be appropriately selected depending on, for example, the mixing amount of the inorganic filler. As a mixing device, a single-screw extruder, a twin-screw extruder, a roll, a Banbury mixer, or various kneaders may be used. From the standpoint of the dispersibility of the resin components and the stability of the crosslinking reaction, an enclosed mixer, such as Banbury mixer or various kneaders is preferable.

Further, commonly, when the forgoing inorganic filler is mixed in an amount exceeding 100 parts by mass with respect to 100 parts by mass of the base resin, these are preferably melt-mixed using a continuous mixer, a dispersion kneader (i.e. a pressurizing kneader), Banbury mixer or the like, each of which is required to work as a closed mixer.

A base resin mixing method is not particularly limited. For example, the base resin may be mixed as it is. Each component, for example, a resin component such as a chlorinated polyethylene or a polyvinyl chloride, and a plasticizer may be each separately mixed.

In the present invention, when each component described above is melt-mixed at one time, melt-mixing conditions are not particularly limited, and the conditions in the step (a-2) can be adopted.

In this case, part or all of the silane coupling agent is adsorbed or bonded to the inorganic filler in melt-mixing.

In the step (a), particularly in the step (a-2), the plasticizer in the base resin is used in the amount such that it satisfies the above-described content percentage.

In the step (a), especially in the step (a-2), the above-mentioned each component is preferably melt-mixed without substantially mixing the silanol condensation catalyst. Thus, condensation reaction of the silane coupling agents can be suppressed, melt-mixing is easily conducted, and a desired shape can be obtained at the time of extrusion forming. Here, the term "without substantially mixing" does not meant to exclude the situation wherein the silanol condensation catalyst unavoidably exists, and means that the silanol condensation catalyst may exist at a degree at which the above-mentioned problem due to silanol condensation of the silane coupling agent is not caused. For example, in the step (a-2), the silanol condensation catalyst may exist when the content is 0.01 part by mass or less, with respect to 100 parts by mass of the base resin.

In the step (a), the blending amount of any other resin that can be used in addition to the above-described component or the above-described additive is appropriately set within the range in which the object of the present invention is not adversely affected.

In the step (a), the above-described additive, particularly, the antioxidant or the metal inactivator may be mixed in any step or to any component, but may be mixed in the carrier resin in view of not inhibiting the grafting reaction of the silane coupling agent mixed in the inorganic filler to the resin.

In the step (a), particularly in the step (a-2), it is preferable that the crosslinking assistant is not substantially mixed. If the crosslinking assistant is not substantially mixed, the crosslinking reaction between the resin components is hard to occur by the organic peroxide in melt-mixing, and the product having excellent flexibility or appearance can be obtained. In addition, the grafting reaction of the silane coupling agent to the resin is hard to occur, and the product having excellent heat resistance can be obtained. Here, an expression "not substantially mixed" means that the cross-linking assistant may exist at a degree at which the above-described problem is not caused, and does not exclude the crosslinking assistance existing inevitably.

By performing the step (a) in this way, a grafting reaction site of the silane coupling agent and a site of the base resin that is capable of causing the grafting reaction are subjected to the grafting reaction due to radicals occurred from an organic peroxide, thereby preparing a silane masterbatch (also referred to as a silane MB) that is used for the production of a masterbatch mixture. This silane MB contains a silane crosslinkable resin in which the silane coupling agent is grafted to the base resin at a degree at which the resin can be formed in the step (b) described later.

In the production method of the present invention, the step (b) in which the silane MB obtained in the step (a) is mixed with the silanol condensation catalyst, and then the resultant mixture is formed, is then performed.

In the step (b), when part of the resin is melt-mixed in the above-described step (a-2), it is preferred that the remainder of the resin and the silanol condensation catalyst be melt-mixed, to prepare a catalyst masterbatch (also referred to as a catalyst MB), and this catalyst MB be used. In addition, any other resin can be used in addition to the remainder of the base resin. In mixing in the step (b), as described above, at least one of the chlorinated polyethylene, the polyvinyl chloride, or the plasticizer may be used as the rest of the base resin.

The mixing ratio of the rest of the above-described base resin as a carrier resin and the silanol condensation catalyst is not particularly limited. The amount of the carrier resin is preferably set to the range of 3% to 45% by mass with respect to 100% by mass of the base resin.

The mixing only needs to be performed by a method having a capability of uniformly performing mixing, and specific examples thereof include mixing (melt-mixing) performed under melting of the base resin. The melt-mixing can be performed in a manner similar to the melt-mixing in the above-described step (a-2). For example, the mixing temperature is preferably from 80 to 250° C., and more preferably from 100 to 240° C. Other conditions such as a mixing time can be appropriately set.

The catalyst MB to be thus prepared is a mixture of the silanol condensation catalyst and the carrier resin, and the filler to be added if desired.

On the other hand, when all of the base resin is melt-mixed in the step (a-2), the silanol condensation catalyst itself, or a mixture of any other resin and the silanol condensation catalyst is used in the step (b). A method of mixing any other resin and the silanol condensation catalyst is similar to the method for the above-described catalyst MB.

A blending amount of any other resin is preferably 1 to 60 parts by mass, more preferably 2 to 50 parts by mass, and further preferably 2 to 40 parts by mass, with respect to 100 parts by mass of the base resin, in view of capability of promoting the grafting reaction in the step (a-2), and also difficulty in generating the aggregated substance in forming.

In the production method of the present invention, the silane MB and the silanol condensation catalyst (the silanol condensation catalyst itself, the catalyst MB prepared or the mixture of the silanol condensation catalyst and any other resin) are mixed.

As the mixing method, any mixing method may be employed as long as the uniform mixture can be obtained as mentioned above. For example, the mixing is basically similar to the melt-mixing in the step (a-2). There are resin components whose melting points cannot be measured by DSC or the like, elastomers for example, but melt-mixing is performed at a temperature at which at least the base resin melts. The melting temperature is appropriately selected according to the melting temperature of the base resin or the carrier resin, and it is preferably from 80 to 250° C., and more preferably from 100 to 240° C. Other conditions, for example, a mixing (kneading) time can be appropriately set.

In the step (b), in order to avoid the silanol condensation reaction, it is preferable that the silane MB and the silanol condensation catalyst are not kept in a high temperature state for a long period of time in the state of being mixed.

In the step (b), the silane MB and the silanol condensation catalyst only need to be mixed, and the silane MB and the catalyst MB are preferably melt-mixed.

In the present invention, the silane MB and the silanol condensation catalyst can be dry-blended before both are melt-mixed. A method and conditions of dry blending are not particularly limited, and specific examples thereof include dry mixing and conditions in the step (a-1). The masterbatch mixture containing the silane MB and the silanol condensation catalyst is obtained by this dry blending.

In the step (b), the inorganic filler may be used. In this case, a blending amount of the inorganic filler is not particularly limited, and is preferably 350 parts by mass or less, with respect to 100 parts by mass of the carrier resin. The reason is that, if the blending amount of the inorganic filler is excessively large, the silanol condensation catalyst is hard to disperse, and the crosslinking becomes hard to progress. On the other hand, if the blending amount of the inorganic filler is excessively small, a crosslinking degree of the formed body is reduced and sufficient heat resistance is not obtained in several cases.

In the above-described step (a) and step (b), at least one of the melt-mixing in the step (a) and the mixing in the step (b) is preferably performed in the presence of hydrotalcite. Examples thereof include: an aspect of performing either one of the melt-mixing in the step (a) and the mixing in the step (b) in the presence of hydrotalcite; and an aspect of performing both the melt-mixing in the step (a) and the mixing in the step (b) in the presence of hydrotalcite. Above all, an aspect of performing at least the melt-mixing in the step (a) in the presence of hydrotalcite is more preferable. By performing the mixing in the presence of hydrotalcite, a chloride produced by decomposition of the polyvinyl chloride is trapped, whereby generation of hydrogen chloride and other chloride-based compounds can be suppressed. Further, in a case where a formed body is an electric wire, an alternative corrosion of the electric wire can be suppressed. Further, corrosion of the metal to be used in the formed body or of the surrounding metal can be suppressed. The expression "performing the mixing. in the presence of hydrotalcite" means to use the hydrotalcite as one of the inorganic fillers.

In a case of performing the mixing in the step (a) and the step (b) in the presence of hydrotalcite, the blending amount of the hydrotalcite in each step is appropriately set within the blending amount range of the above-described inorganic filler. For example, the blending amount of the hydrotalcite in the step (a) is preferably from 0.3 to 18 parts by mass and more preferably from 1 to 10 parts by mass, with respect to 100 parts by mass of the base resin. The blending amount of the hydrotalcite in the step (b) is preferably from 0.3 to 15 parts by mass and more preferably from 1 to 10 parts by mass, with respect to 100 parts by mass of the base resin.

In the present invention, the mixing in the step (a) and step (b) can be simultaneously or continuously performed.

In the step (b), the mixture thus obtained is formed (shaped).

This forming step only needs to be capable of forming the mixture, and a forming method and forming conditions are appropriately selected according to a form of the heat-resistant product of the present invention. Specific examples of the forming method include extrusion forming using an extruder, extrusion forming using an injection forming machine, and forming using any other forming machine. The extrusion forming is preferable when the heat-resistant product of the present invention is the electric wire or the optical fiber cable.

In the step (b), the forming step can be performed simultaneously with the above-described mixing step or both steps can be continuously performed. That is, specific examples of one embodiment of the melt-mixing in the mixing step include an aspect of melt-mixing a forming raw material, in the melt-forming, for example, in the extrusion forming, or immediately before the extrusion forming. For example, pellets may be blended with each other at ordinary temperature or a high temperature, such as dry blend, and then placed (melt-mixed) in a forming machine, or the pellets may be blended, and then melt-mixed, re-pelletized, and then placed in a forming machine. More specifically, a series of steps can be employed in which a mixture of the silane MB and the silanol condensation catalyst (forming-raw materials) is melt-mixed in a coating device, and then, extruded and coated on a periphery of a conductor or the like, and formed into a desired shape.

Thus, the formed body of the heat-resistant chlorine-containing crosslinkable resin composition is obtained, in which the silane masterbatch and the silanol condensation catalyst are dry-blended, to prepare the masterbatch mixture, and the masterbatch mixture is introduced into the forming machine and formed.

Here, a melt mixture of the masterbatch mixture contains the silane crosslinkable resins with different crosslinking methods. In this silane crosslinkable resin, the reaction site of the silane coupling agent may be bonded or adsorbed to the inorganic filler, but is not subjected to silanol condensation as described later. Accordingly, the silane crosslinkable resin at least contains a crosslinkable resin in which the silane coupling agent bonded or adsorbed to the inorganic filler is grafted to the base resin, particularly to chlorinated polyethylene and polyvinyl chloride, and a crosslinkable resin in which the silane coupling agent not bonded or adsorbed to the inorganic filler is grafted to the base resin. In addition, the silane crosslinkable resin may have the silane coupling agent to which the inorganic filler is bonded or adsorbed, and the silane coupling agent to which the inorganic filler is not bonded or adsorbed. Further, the silane crosslinkable resin may contain the resin component unreacted with the silane coupling agent.

As described above, the silane crosslinkable resin is an uncrosslinked body in which the silane coupling agent is not subjected to silanol condensation. Practically, if the melt-mixing is performed in the step (b), crosslinking of part (partial crosslinking) is inevitable, but at least formability in forming is to be kept on the heat-resistant crosslinkable chlorine-containing composition to be obtained.

In the formed body to be obtained through the step (b), partial crosslinking is inevitable in a manner similar to the above-described mixture, but the formed body is in a partially crosslinked state of keeping formability at which the composition can be formed in the step (b). Accordingly, this heat-resistant chlorine-containing crosslinked resin formed body of the present invention is obtained as a formed body crosslinked or finally crosslinked, by performing the step (c).

In addition, the formed body obtained according to the step (b) has small adhesiveness, and has characteristics hard to cause adhesion (adhesion resistance) even in a state in which the formed bodies are brought into contact with each other.

In the method for producing the heat-resistant chlorine-containing crosslinked resin formed body of the present invention, the step (c) of bringing the formed body obtained in the step (b) into contact with water is performed. Thus, the reaction site of the silane coupling agent is hydrolyzed into silanol, and hydroxyl groups of the silanol are subjected to condensation by the silanol condensation catalyst existing in the formed body, and the crosslinking reaction occurs. Thus, the heat-resistant chlorine-containing crosslinked resin formed body in which the silane coupling agent is subjected to silanol condensation and crosslinked can be obtained.

The treatment itself in this step (c) can be carried out according to an ordinary method. The condensation reaction between the silane coupling agents progresses just in storage at ordinary temperature. In particular, as mentioned above, this silane crosslinking (condensation) rapidly progresses in the heat-resistant chlorine-containing crosslinkable resin composition containing polyvinyl chloride as the base resin. Accordingly, in the step (c), it is unnecessary to positively bring the formed body into contact with water.

In order to accelerate this crosslinking reaction, the formed body can also be contacted positively with moisture. For example, the method of positively contacting the formed body with water can be employed, such as immersion into warm water, placement in a wet heat bath, and exposure to high temperature water vapor. In addition, pressure may be applied in order to penetrate moisture thereinto on the above occasion.

Thus, the method for producing the heat-resistant chlorine-containing crosslinked resin formed body of the present invention is performed, and the heat-resistant chlorine-containing crosslinked resin formed body is produced.

The heat-resistant chlorine-containing crosslinked resin formed body contains a cured product of the above-described heat-resistant chlorine-containing crosslinkable resin composition. Accordingly, the heat-resistant chlorine-containing crosslinked resin formed body contains a silane-crosslinked resin obtained by crosslinking the above-described silane crosslinkable resin. This silane-crosslinked resin is a resin in which a (silane crosslinkable) resin was condensed through a silanol bond (siloxane bond).

As one form of this silane crosslinked resin formed body, the formed body contains the silane crosslinked resin and the inorganic filler. Here, the inorganic filler may be bonded to the silane coupling agent of the silane crosslinked resin. Accordingly, the present invention includes an aspect in which the base resin is crosslinked (bonded) with the inorganic filler through the silanol bonding. Specifically, the silane crosslinked resin contains at least the crosslinked resin in which the base resin is bonded or adsorbed to the inorganic filler by the silane coupling agent and are bonded (crosslinked) through the inorganic filler and the silane coupling agent, and the crosslinked resin in which the reaction sites of the silane coupling agent grafted to the above-described base resin are hydrolyzed and cause the silanol condensation reaction with each other, thereby being crosslinked through the silane coupling agent. In addition, in the silane crosslinked resin, bonding (crosslinking) through the inorganic filler and the silane coupling agent and crosslinking through the silane coupling agent may be mixed. Further, the silane crosslinked resin may contain the resin component unreacted with the silane coupling agent and/or the uncrosslinked silane crosslinkable resin.

The above-described cured product with a focus on its constituents and its partial structure may be expressed as follows. That is, the cured product contains: a base resin-constituent containing a chlorinated polyethylene, a polyvinyl chloride and a plasticizer; an inorganic filler-constituent; and a silane coupling agent-constituent, as each constituent. The content of the inorganic filler-constituent and the silane coupling agent-constituent in this cured product ordinarily has the same definition as the above-described blending amount and a preferable range thereof is the same.

One aspect of the cured product has a crosslinked portion composed of the silane coupling agent-constituent, and a graft portion composed of the silane coupling agent-constituent combined with the inorganic filler-constituent. The above-described crosslinked portion refers to a partial structure in which the silane coupling agent-constituent cross-links the base resins, of the above-described crosslinked resin formed by hydrolysis and then a silanol condensation reaction of the reaction sites of the silane coupling agent grafted to the base resin. Further, the above-described graft portion refers to a partial structure in which the silane coupling agent-constituent combined with the inorganic filler-constituent is grafted to the base resin, of the above-described crosslinked resin formed by combining or adsorbing the base resin with (or to) the inorganic filler through a silane coupling agent. The graft portion includes a partial structure in which a plurality of the silane coupling agent constituents combined with one inorganic filler constituent is grafted to a plurality of the base resins, thereby cross-linking the plurality of the base resins. This graft portion is preferably a partial structure formed by combining the base resin and the inorganic filler through a silanol bond.

One aspect of the above-described cured product contains: specifically at least an inorganic filler-cured product formed by combining the chlorinated polyethylene-constituent or the polyvinyl chloride-constituent and the inorganic filler-constituent through the silane coupling agent-constituent; and a chlorine-containing resin-cured product formed by crosslinking the chlorinated polyethylene-constituent or the polyvinyl chloride-constituent through the silane coupling agent-constituent. The inorganic filler-cured product includes an inorganic filler-cured product formed by combining one inorganic filler-constituent with one or a plurality of chlorinated polyethylene-constituents or polyvinyl chloride-constituents through a plurality of or one silane coupling agent-constituent.

The cured product also includes a cured product in which the inorganic filler-cured product and the chlorine-containing resin-cured product are further crosslinked.

The above-described inorganic filler-cured product has the above-described graft portion, and the above-described chlorine-containing resin-cured product has the above-described crosslinked portion.

The above-described production method of the present invention can be described as follows.

The method for producing the heat-resistant chlorine-containing crosslinked resin formed body, having the following step (A), step (B) and step (C), in which the step (A) has the following step (A1) to step (A4).

Step (A): a step of mixing 0.003 to 0.3 part by mass of an organic peroxide, 0.5 to 400 parts by mass of an inorganic filler, and more than 2 parts by mass and 15.0 parts by mass or less of a silane coupling agent, with respect to 100 parts by mass of a base resin containing a chlorinated polyethylene and a polyvinyl chloride and plasticizer; and a silanol condensation catalyst, to obtain a mixture.

Step (B): a step of forming the mixture obtained in the step (A), to obtain a formed body.

Step (C): a step of bringing the formed body obtained in the step (B) into contact with water, to obtain a heat-resistant chlorine-containing crosslinked resin formed body.

Step (A1): a step of mixing at least the inorganic filler and the silane coupling agent.

Step (A2): a step of obtaining a reaction composition by melt-mixing the mixture obtained by the step (A1), and all or part of the base resin in the presence of the organic peroxide at a temperature equal to or higher than the decomposition temperature of the organic peroxide, thereby subjecting the silane coupling agent to grafting to the base resin through a grafting reaction.

Step (A3): a step of mixing the silanol condensation catalyst with, as a carrier resin, a resin different from the base resin or a remainder of the base resin.

Step (A4): a step of mixing the reaction composition as a melt mixture obtained in the step (A2) and the mixture obtained in the step (A3).

In the above-described method, the step (A) corresponds to the mixing in the above-described step (a) and a step to the mixing in the step (b); the step (B) corresponds to the forming step in the above-described step (b); and the step (C) corresponds to the above-described step (c). In addition, the step (A1), the step (A2), the step (A3) and the step (A4) correspond to the above-described step (a-1), the step (a-2), and the step to the mixing in the above-described step (b), respectively.

Further, in the above-described method, all or part of the base resin to be used in the step (A2) contains from 5% to 55% by mass of the plasticizer, assuming that the base resin is 100% by mass.

Details of a reaction mechanism in the production method of the present invention are unknown yet, but it is considered as described below.

First, explanation will be given about development of heat resistance and strength and further, improvement effect of poor (extrusion) outer appearance and prevention effect of lowering of physical properties, all of which are preferably achieved, of the heat-resistant chlorine-containing crosslinked resin formed body.

In general, if the organic peroxide is added to the base resin, particularly a chlorinated polyethylene and a polyvinyl chloride, radicals rapidly generate, so that a crosslinking reaction between the base resins or a decomposition reaction is likely to occur. By this, dimples generate in the heat-resistant chlorine-containing crosslinked resin formed body obtained, which results in lowering of physical properties.

In the present invention, however, the inorganic filler and the silane coupling agent are mixed before melt-mixing with the base resin and/or in the melt-mixing. Specifically, in the step (a), the silane coupling agent is blended in a relatively large amount, and also said silane coupling agent is preliminarily combined with the inorganic filler through a silanol bond, a hydrogen bond, or an intermolecular bond. In particular, in a preferable aspect of the step (a), a processing of causing this bond and a melt-mixing processing are performed separately. This allows suppression of volatilization of the silane coupling agent at the time of melt-mixing processing. Further, a condensation reaction between the silane coupling agents can be suppressed. Therefore, it is considered that a chance for a grafting reaction between the grafting reaction site of the silane coupling agent and the base resin, particularly a chlorinated polyethylene and a polyvinyl chloride, is increased. It is considered that a binding reaction of radicals occurred in the silane coupling agent and the base resin thus retained becomes dominant than a crosslinking reaction between the above-described base resins, and becomes dominant than a decomposition reaction.

Further, in the present invention, a base resin containing a chlorinated polyethylene and a polyvinyl chloride is used in the step (a).

The chlorinated polyethylene is relatively easy to be subjected to a crosslinking reaction by the organic peroxide. On the other hand, for the polyvinyl chloride, a decomposition reaction becomes dominant rather than the crosslinking reaction. Accordingly, in the step (a), if the organic peroxide is decomposed in the presence of a large amount of the silane coupling agent, the above-described grafting reaction of the silane coupling agent and decomposition reaction of the polyvinyl chloride become dominant due to coexistence of the chlorinated polyethylene and the polyvinyl chloride, whereby the crosslinking reaction of the chlorinated polyethylene or the polyvinyl chloride can be suppressed sufficiently. Accordingly, generation of a crosslink portion or a gel portion due to a side reaction can be prevented.

In this way, in the present invention, a silane crosslinking reaction to the base resin becomes possible, and further, it is hard to cause a crosslinking reaction of the base resin, particularly the chlorinated polyethylene in the present reaction (the step (a)). Further, condensation between the silane coupling agents can be suppressed. Therefore, it is hard to cause generation of dimples and lowering of physical properties, so that it becomes possible to obtain a heat-resistant chlorine-containing crosslinked resin formed body having a good appearance.

When these materials are melt-mixed in the step (a), the silane coupling agent bonded or adsorbed to the inorganic filler by weak bonding (interaction by the hydrogen bonding, interaction between ions, partial charges or dipoles, action by adsorption or the like) is detached from the inorganic filler, resulting in causing the grafting reaction with the base resin. In the silane coupling agent thus graft-reacted, the reaction sites capable of causing silanol condensation are subjected to the condensation reaction (crosslinking reaction) to form the base resin crosslinked through the silanol condensation. The heat resistance of the heat-resistant chlorine-containing crosslinked resin formed body obtained through this crosslinking reaction is increased, and, for example, the heat-resistant chlorine-containing crosslinked resin formed body which is not melted even at a high temperature can be obtained.

On the other hand, in the silane coupling agent bonded to the inorganic filler by strong bonding (chemical bonding with the hydroxyl group or the like on the surface of the inorganic filler, or the like), this condensation reaction by the silanol condensation catalyst in the presence of water is hard to occur, and bonding with the inorganic filler is kept. Therefore, bonding (crosslinking) of the base resin with the inorganic filler through the silane coupling agent is formed. By this, adhesion between the base resin and the inorganic filler becomes stronger (i.e. more rigid), whereby it becomes possible to obtain a heat-resistant chlorine-containing crosslinked resin formed body with high mechanical strength. In particular, if plural silane coupling agents are multiply bonded to one inorganic filler particle surface, further enhancement in strength can be expected. Further, a formed body with a good abrasive resistance and scratch resistance is obtained.

It is estimated that it becomes possible to obtain a heat-resistant chlorine-containing crosslinked resin formed body achieving combination of heat resistance and strength at a high level by forming such silane-grafted resin together with a silanol condensation catalyst, and then bringing it into contact with moisture. Further, the heat-resistant chlorine-containing crosslinked resin formed body obtained in this way becomes excellent in appearance.

In the present invention, a heat-resistant chlorine-containing crosslinked resin formed body with a high heat resistance can be obtained by mixing, with respect to 100 parts by mass of a base resin, an organic peroxide at the rate of 0.003 parts by mass or more, preferably 0.005 parts by mass or more and 0.3 parts by mass or less, preferably 0.1 parts by mass or less, and further mixing a silane coupling agent together therewith at the rate of more than 2 parts by mass and 15.0 parts by mass or less at the presence of an inorganic filler.

Next, explanation will be given about improvement in flexibility of the heat-resistant chlorine-containing crosslinked resin formed body.

In the present invention, a chlorinated polyethylene, a polyvinyl chloride and a plasticizer as a base rein are used at the time of reaction between a silane coupling agent and a base resin component in the step (a). By this, a grafting reaction of the silane coupling agent can be slowed down and also can be homogenized by a difference in reactivity between the chlorinated polyethylene and the polyvinyl chloride due to the organic peroxide. Further, a crosslinking reaction of the polyvinyl chlorides as a side reaction can be suppressed to a large extent.

In this way, both slow-down and homogenization of the grafting reaction allow silane crosslink of the chlorine-containing resin, whereby even if a plasticizer is contained, a strong strength obtained as described above can be maintained. Further, it is considered that flexibility is exerted by suppression of the above-described side reaction and incorporation of the plasticizer.

In the present invention, a chlorinated polyethylene and a polyvinyl chloride are contained in the base resin. Therefore, the heat-resistant chlorine-containing crosslinked resin formed body can be excellent in weather resistance and oil resistance. Further, the base resin contains a plasticizer in addition to the above-described resins. Therefore, the heat-resistant chlorine-containing crosslinked resin formed body can have an excellent cold resistance. Further, in the present invention, a heat-resistant chlorine-containing crosslinked resin formed body having the above-described characteristics can be produced with a good productivity without using a special machine such as a chemical crosslinking machine and an electron beam crosslinking machine.

The production method of the present invention can be applied to production of a product (also including a semi-product, a part, and a member) that requires heat resistance; a further product (also including a semi-product, a part, and a member) that requires at least one of characteristics including mechanical strength, tensile elongation, flexibility, weather resistance, oil resistance, cold resistance, and flame retardancy; and a component part or its member of the product, such as rubber material. Accordingly, the heat-resistant product of the present invention is regarded as a product having heat resistance and if needed, also having the above-described characteristics. At this time, the heat-resistant product may be a product containing a heat-resistant chlorine-containing crosslinked resin formed body or a product consisting only of a heat-resistant chlorine-containing crosslinked resin formed body.

Specific examples of such a heat-resistant product include an electric wire, such as a heat-resistant flame-retardant insulated wire, a coating material for heat-resistant flame-retardant cable or optical fiber cable, a rubber substitute wire and cable material, other heat-resistant flame-retardant wire parts, a flame-retardant heat-resistant sheet, and a flame-retardant heat-resistant film. In addition, the specific examples further include a power supply plug, a connector, a sleeve, a box, a tape-base material, a tube, a sheet, a packing, a cushion material, a seismic isolating material, a wiring material to be used in internal and external wiring for electric and electronic instruments, and particularly an electric wire or an optical fiber cable.

Among the above described products, the production method of the present invention is particularly preferably applied to production of electric wire and optical fiber cable, and it can form a coating material (an insulator, a sheath) thereof.

When the heat-resistant product of the present invention is an extrusion formed article such as the electric wire or the optical fiber cable, the product can be produced, preferably, while forming raw materials are melt-kneaded in the extruder (extrusion coating device) to prepare the heat-resistant crosslinkable chlorine-containing resin composition, by extruding this heat-resistant crosslinkable chlorine-containing resin composition on an outer periphery of the conductor or the like, to coat the conductor or the like.

Such a heat-resistant product of the present invention can be formed by extruding and coating the heat-resistant crosslinkable chlorine-containing resin composition, even if a large amount of inorganic fillers is added thereto, on a circumference of a conductor or a circumference of a conductor longitudinally lapped or twisted with tensile strength fibers, by using a general-purpose extrusion coating device, without using a special machine such as an electron beam crosslinking machine. For example, as the conductor, a single wire, a stranded wire or the like of annealed copper can be used. Moreover, as the conductor, in addition to a bare wire, a tin-plated conductor or a conductor having an enamel-coating insulation layer can be used. A thickness of the insulation layer (coating layer formed of the heat resistant crosslinkable chlorine-containing resin composition of the present invention) formed around the conductor is not particularly limited, but is generally about 0.15 to 5 mm.

EXAMPLES

The present invention will be described in more detail based on examples given below, but the invention is not meant to be limited by these.

In Table 1, the numerical values for blending amount in each column represent mass part, unless otherwise specified. In a case where the column for the blending amount is blank, this indicates that the blending amount of said component is 0 in terms of mass part.

Details of each compound shown in Table 1 are described below.

The chlorine content of the chlorinated polyethylene is according to the above measurement method.

<Resin Component>

(Chlorinated Polyethylene)

"ELASLEN 401A" (trade name, manufactured by Showa Denko K.K., chlorine content: 40% by mass)

"ELASLEN 402NA-X5" (trade name, manufactured by Showa Denko K.K., chlorine content: 40% by mass)

"ELASLEN 351A" (trade name, manufactured by Showa Denko K.K., chlorine content: 35% by mass)

"ELASLEN 301A" (trade name, manufactured by Showa Denko K.K., chlorine content: 30% by mass)

(Polyvinyl Chloride)

"ZEST 1400" (trade name, manufactured by Shin Daiichi Enbi Co., Ltd.)

"ZEST 1000" (trade name, manufactured by Shin Daiichi Enbi Co., Ltd.)

(Chloroprene Rubber)

"SKYPRENE E-33" (trade name, manufactured by Tosoh Corporation, chlorine content: 40% by mass)

(Other Resins)

"Hytrel 2401" (trade name, manufactured by DU PONT-TORAY CO., LTD., polyester elastomer)

(Plasticizer)

"ADECASIZER 9N" (trade name, manufactured by ADECA Corporation, trimellitic acid ester-based plasticizer)

"ADECASIZER PN-650" (trade name, manufactured by ADECA Corporation, polyester-based plasticizer)

"SHELL DL911P" (trade name, manufactured by Shell Chemicals, Ltd., phthalic acid ester-based plasticizer)

<Organic Peroxide>

"PERHEXA 25B" (trade name, manufactured by NOF CORPORATION., 2,5-dimethyl-2,5-di(tert-butylperoxy)hexane, decomposition temperature 149° C.)

"PERCUMYL D" (manufactured by NOF Corporation, dicumyl peroxide, decomposition temperature 151° C.)

<Inorganic Filler>

"DHT4-A" (trade name, manufactured by Kyowa Chemical Industry Co., Ltd., hydrotalcite)

"KISUMA 5L" (trade name, manufactured by Kyowa Chemical Industry Co., Ltd., magnesium hydroxide pre-treated with a silane coupling agent)

"CRYSTALITE 5X" (trade name, manufactured by Tatsumori Ltd., crystalline silica)

"SOFTON 2200" (trade name, manufactured by BIHOKU FUNKA KOGYO CO., LTD., calcium carbonate)

"Aerosil 200" (trade name, manufactured by Japan Aerosil corporation, hydrophilic fumed silica, amorphous silica)

<Silane Coupling Agent>

"KBM-1003" (trade name, manufactured by Shin-Etsu Chemical Co., Ltd., vinyltrimethoxysilane)

<Silanol Condensation Catalyst>

"ADKSTAB OT-1" (trade name, manufactured by ADEKA CORPORATION, dioctyltin dilaurate)

<Antioxidizing Agent>

"IRGANOX 1010" (trade name, manufactured by BASF, pentaerythritol tetrakis-[3-(3,5-di-tert-butyl-4-hydroxyphenyl)propionate])

Examples and Comparative Examples

In Examples, and Comparative Examples, part of the base resin is to be used as a carrier resin for a catalyst MB.

First, an inorganic filler and a silane coupling agent, in mass ratios listed in Table, were placed in a 10L Henschel mixer manufactured by Toyo Seiki Seisaku-sho, Ltd. and the resultant mixture was mixed at room temperature (25° C.) for 30 minutes to obtain a powder mixture. Next, the power mixture thus obtained, and each component listed in the base resin column and the organic peroxide in Table 1, in mass ratios listed in Table 1, were placed in a 2L Banbury mixer manufactured by Nippon Roll MFG. Co., Ltd., and the resultant mixture was melt-mixed at a temperature equal to or higher than a decomposition temperature of the organic peroxide, specifically, at 190° C., for 10 minutes, and then discharged at a material discharge temperature of 190° C., to obtain a silane MB. The silane MB obtained contains a silane crosslinkable resin in which the silane coupling agent is graft-reacted onto the base resin.

Meanwhile, a carrier resin, a silanol condensation catalyst and an antioxidant were melt-mixed by a Banbury mixer at 150 to 170° C., in mass ratios listed in Table 1, and the resultant mixture was discharged at material discharge temperature of 170 to 180° C., to obtain a catalyst MB. This catalyst MB is a mixture of the carrier resin and the silanol condensation catalyst.

Then, the silane MB and the catalyst MB were placed in an enclosed ribbon blender, and the resultant mixture was dry-blended at room temperature (25° C.) for 5 minutes, to obtain a dry-blended product (masterbatch mixture). At this time, a mixing ratio of the silane MB to the catalyst MB is a mass ratio listed in Table 1.

Then, the obtained dry-blended product was introduced into an extruder equipped with a screw having a screw diameter of 30 mm with L/D=24 (ratio of screw effective length L to diameter D) (compression zone screw temperature: 170° C., head temperature: 200° C.). While the dry-blended product was melt-mixed in this extruder, the melted mixture was coated on an outside of a 1/0.8 TA conductor at a thickness of 1 mm, to obtain a coated conductor having an outer diameter of 2.8 mm.

A heat-resistant chlorine-containing crosslinkable resin composition is prepared by melt-mixing the above-described dry-blended product in the extruder before extrusion forming. This heat-resistant chlorine-containing crosslinkable resin composition is a melt-mixture of the silane MB and the catalyst MB, and contains the above-mentioned silane crosslinkable resin.

100 m of the coated conductor obtained in this way was wound on a bobbin with a shell diameter (i.e. a body diameter) of 250 mm. After leaving it for 1 week in this state in an atmosphere of temperature 40° C. and relative humidity 95%, the coated conductor (a formed body of the heat-resistant chlorine-containing crosslinkable resin composition) was brought into contact with moisture. In this way, a wire was produced, which had a coating layer composed of the heat-resistant chlorine-containing crosslinked resin formed body on the outer periphery of the above-described conductor.

The heat-resistant chlorine-containing crosslinked resin formed body as a coating layer contains the above-described cured product, and has the above-described silane crosslinked resin.

The following tests were conducted with respect to each wire produced and the results were shown in Table 1.

<Heat Resistance Test>

As the heat resistance test, a heat denaturation test was conducted with respect to each wire under the conditions of: at the measuring temperature of 200° C., the heating and pressurizing time of 30 min, and the load of 5N in conformity with UL1581.

In this test, the wire exhibiting where the denaturation ratio of 40% or less was ranked as "A", the wire exhibiting where the denaturation ratio of exceeding 40% and 50% or less was ranked as "B", and the wire exhibiting where the denaturation ratio of exceeding 50% was ranked as "C". In this test, the rank "B" or higher, i.e. "A" and "B", is passed the test.

<Flexibility Test>

The flexibility test was conducted by measuring durometer hardness using a Durometer Type A in conformity with JIS K7215. For the durometer hardness, a range of 60 or more and 95 or less is the passing range.

The durometer hardness is preferably 90 or less, and more preferably 82 or less.

<Tensile Strength and Tensile Elongation Test>

Using a conduit piece prepared by picking a conductor out of each of the wires, a tensile test was conducted under the conditions of: gauge length 20 mm and tension speed 200 mm/min in conformity with JIS C 3005, to thereby measure a tensile strength (MPa) and a tensile elongation (%).

In this test, when the tensile strength is 10 MPa or more, the conduit piece is passed the test, and the tensile strength is preferably 14 MPa or more. Further, when the tensile elongation is 100% or more, the conduit piece is passed the test, and the tensile elongation is preferably 150% or more.

<Cold Resistance Test>
Cold Resistance Test 1

As the cold resistance test, a low-temperature winding test (a low-temperature test) was conducted in conformity with JIS C 3005. The wire and a mandrel with the same outer diameter as the self-diameter of the wire were left in a thermostat at −15° C. for 4 hours. Then, the wire was wound six turns around the mandrel. After winding, the wire was allowed to return to ordinary temperature (room temperature) and outer appearance of the wire (coating layer) was observed.

In this test, the wire where there is neither crack nor fracture in a coating layer was evaluated as "A", whereas the wire where there is crack or fracture therein was evaluated as "D".

This test is a reference test, and the evaluation of "A" is a pass level.

Cold Resistance Test 2

Cold resistance test 2 was conducted in the same manner as the cold resistance test 1, except for changing the thermostat temperature to −25° C.

<Extrusion Outer Appearance Test>

As the extrusion outer appearance test, in the production of coated conductors, evaluation was performed by observing outer appearance of the coated conductor.

In this test, when a coated conductor could be formed into a wire shape without dimples in the outer appearance of the coated conductor, such coated conductor was evaluated as "A". Although there were no dimples in the outer appearance of the coated conductor, when the surface thereof was little rough, such coated conductor was evaluated as "B". Although occurrence of dimples could be confirmed, when there were almost no problems in the outer appearance and a coated conductor could be formed into a wire shape, such coated conductor was evaluated as "C". When considerably poor outer appearance occurred and a coated conductor could not be formed into a wire shape, such coated conductor was evaluated as "D".

This test is a reference test and the evaluation of "C" or higher, i.e. "C", "B" and "A", is a pass level.

TABLE 1

| | | | | Example | | | | | |
|---|---|---|---|---|---|---|---|---|---|
| | | | | 1 | 2 | 3 | 4 | 5 | 6 |
| Silane MB | Base resin (part of base resin utilized in step (a)) | Chlorinated polyethylene | ELASLEN 401A | 19 | 23 | 14 | 41 | 54 | |
| | | Chlorinated polyethylene | ELASLEN 402NA-X5 | | | | | | 18 |
| | | Chlorinated polyethylene | ELASLEN 351A | | | | | | |
| | | Chlorinated polyethylene | ELASLEN 301A | | | | | | |
| | | Polyvinyl chloride | ZEST1400 | 44 | 55 | 33 | 41 | 24 | |
| | | Polyvinyl chloride | ZEST1000 | | | | | | 47 |
| | | Chloroprene rubber | SKYPRENE E-33 | | | | | | 7 |
| | | Trimellitate plasticizer | ADECASIZER 9N | 31 | | | 10 | | |
| | | PE-based plasticizer | ADECASIZER PN-650 | | | 48 | | | 21 |
| | | Phthalate plasticizer | SHELL DL911P | | 15 | | | 14 | |
| | | Polyester elastomer | Hytrel 2401 | | | | | | |
| | | Amount of the plasticizer in 100 mass % of the base resin utilized in step (a) | | 33 | 16 | 51 | 11 | 15 | 23 |
| | Organic peroxide | | PERHEXA 25B | 0.1 | | 0.15 | 0.1 | 0.1 | 0.1 |
| | | | PERCUMYL D | | 0.08 | | | | |
| | Inorganic filler | Hydrotalcite | DHT-4A | 4 | 4 | 4 | 4 | 4 | 4 |
| | | Magnesium hydroxide | KISUMA 5L | | | | | | 100 |
| | | Silica | CRYSTALITE 5X | | | | 20 | | |
| | | Calcium carbonate | SOFTON 2200 | 20 | 20 | 20 | | 10 | 20 |
| | | Silica | Aerosil 200 | 5 | 5 | 5 | 5 | 10 | |
| | Silane coupl. agent | Vinyl trimethoxysilane | KBM-1003 | 5 | 5 | 7 | 5 | 3 | 8 |

TABLE 1-continued

|  |  |  |  |  |  |  |  |  |  |
|---|---|---|---|---|---|---|---|---|---|
| Cat. MB | Carrier resin (rest of base resin utilized in step (b)) | Chlorinated polyethylene | ELASLEN 402NA-X5 |  |  | 2 | 3 |  |  |
|  |  | Polyvinyl chloride | ZEST1400 | 4 | 5 | 2 | 3 | 6 | 5 |
|  |  | Trimellitate plasticizer | ADECASIZER C-9N | 2 | 2 | 1 | 2 | 2 | 2 |
|  | Silanol condens. cat. | Dioctyltin dilaurate | ADKSTAB OT-1 | 0.05 | 0.05 | 0.05 | 0.05 | 0.05 | 0.05 |
|  | Antioxidant | Hindered phenol | IRGANOX 1010 | 0.1 | 0.1 | 0.1 | 0.1 | 0.1 | 0.1 |
|  |  | Content of the plasticizer in the base material |  | 33 | 17 | 49 | 12 | 16 | 23 |
|  | Evaluation | Heat resistance test (200° C., 30 min) |  | A | A | A | A | A | A |
|  |  | Durometer hardness |  | 75 | 88 | 67 | 91 | 84 | 73 |
|  |  | Tensile strength (MPa) |  | 15 | 24 | 10 | 19 | 17 | 13 |
|  |  | Tensile elongation (%) |  | 260 | 120 | 340 | 110 | 360 | 130 |
|  |  | Cold resistance test 1 (Reference test) |  | A | A | A | A | A | A |
|  |  | Cold resistance test 2 (Reference test) |  | A | A | A | D | A | A |
|  |  | Extrusion outer appearance test (Reference test) |  | A | A | A | A | A | A |

|  |  |  |  | Example |  |  |  |
|---|---|---|---|---|---|---|---|
|  |  |  |  | 7 | 8 | 9 | 10 |
| Silane MB | Base resin (part of base resin utilized in step (a)) | Chlorinated polyethylene | ELASLEN 401A |  |  | 35 | 25 |
|  |  | Chlorinated polyethylene | ELASLEN 402NA-X5 |  |  |  |  |
|  |  | Chlorinated polyethylene | ELASLEN 351A | 18 |  |  |  |
|  |  | Chlorinated polyethylene | ELASLEN 301A |  | 17 |  |  |
|  |  | Polyvinyl chloride | ZEST1400 | 53 | 42 | 40 | 50 |
|  |  | Polyvinyl chloride | ZEST1000 |  |  |  |  |
|  |  | Chloroprene rubber | SKYPRENE E-33 |  |  |  |  |
|  |  | Trimellitate plasticizer | ADECASIZER 9N | 11 |  | 20 | 18 |
|  |  | PE-based plasticizer | ADECASIZER PN-650 | 11 |  |  |  |
|  |  | Phthalate plasticizer | SHELL DL911P |  | 27 |  |  |
|  |  | Polyester elastomer | Hytrel 2401 |  | 7 |  |  |
|  |  | Amount of the plasticizer in 100 mass % of the base resin utilized in step (a) |  | 24 | 29 | 21 | 19 |
|  | Organic peroxide |  | PERHEXA 25B | 0.25 |  | 0.1 | 0.1 |
|  |  |  | PERCUMYL D |  | 0.02 |  |  |
|  | Inorganic filler | Hydrotalcite | DHT-4A | 4 | 4 | 4 | 4 |
|  |  | Magnesium hydroxide | KISUMA 5L | 170 |  |  |  |
|  |  | Silica | CRYSTALITE 5X |  |  |  |  |
|  |  | Calcium carbonate | SOFTON 2200 |  | 20 |  |  |
|  |  | Silica | Aerosil 200 |  | 5 | 8 | 5 |
|  | Silane coupl. agent | Vinyl trimethoxysilane | KBM-1003 | 12 | 5 | 3 | 4 |
| Cat. MB | Carrier resin (rest of base resin utilized in step (b)) | Chlorinated polyethylene | ELASLEN 402NA-X5 |  |  |  |  |
|  |  | Polyvinyl chloride | ZEST1400 | 5 | 5 | 3 | 4 |
|  |  | Trimellitate plasticizer | ADECASIZER C-9N | 2 | 2 | 2 | 3 |
|  | Silanol condens. cat. | Dioctyltin dilaurate | ADKSTAB OT-1 | 0.05 | 0.05 | 0.05 | 0.05 |
|  | Antioxidant | Hindered phenol | IRGANOX 1010 | 0.1 | 0.1 | 0.1 | 0.1 |
|  |  | Content of the plasticizer in the base material |  | 24 | 29 | 22 | 21 |
|  | Evaluation | Heat resistance test (200° C., 30 min) |  | A | B | A | A |
|  |  | Durometer hardness |  | 80 | 77 | 70 | 75 |
|  |  | Tensile strength (MPa) |  | 11 | 15 | 20 | 22 |
|  |  | Tensile elongation (%) |  | 110 | 240 | 350 | 320 |
|  |  | Cold resistance test 1 (Reference test) |  | A | A | A | A |
|  |  | Cold resistance test 2 (Reference test) |  | A | A | A | A |
|  |  | Extrusion outer appearance test (Reference test) |  | B | A | A | A |

|  |  |  |  | Comparative example |  |  |  |  |  |
|---|---|---|---|---|---|---|---|---|---|
|  |  |  |  | 1 | 2 | 3 | 4 | 5 | 6 |
| Silane MB | Base resin (part of base resin utilized in step (a)) | Chlorinated polyethylene | ELASLEN 401A | 66 | 40 |  | 15 | 19 | 19 |
|  |  | Chlorinated polyethylene | ELASLEN 402NA-X5 |  |  |  |  |  |  |
|  |  | Chlorinated polyethylene | ELASLEN 351A |  |  |  |  |  |  |
|  |  | Chlorinated polyethylene | ELASLEN 301A |  |  |  |  |  |  |
|  |  | Polyvinyl chloride | ZEST1400 |  | 2 | 66 | 74 | 44 | 44 |
|  |  | Polyvinyl chloride | ZEST1000 |  |  |  |  |  |  |
|  |  | Chloroprene rubber | SKYPRENE E-33 |  |  |  |  |  |  |
|  |  | Trimellitate plasticizer | ADECASIZER 9N | 27 |  |  |  | 31 | 31 |
|  |  | PE-based plasticizer | ADECASIZER PN-650 |  |  |  |  |  |  |
|  |  | Phthalate plasticizer | SHELL DL911P |  | 54 | 27 | 2 |  |  |
|  |  | Polyester elastomer | Hytrel 2401 |  |  |  |  |  |  |
|  |  | Amount of the plasticizer in 100 mass % of the base resin utilized in step (a) |  | 29 | 56 | 29 | 2 | 33 | 33 |
|  | Organic peroxide |  | PERHEXA 25B | 0.1 | 0.1 | 0.1 | 0.1 | 0.002 | 0.7 |
|  |  |  | PERCUMYL D |  |  |  |  |  |  |
|  | Inorganic filler | Hydrotalcite | DHT-4A | 4 | 4 | 4 | 4 | 4 | 4 |
|  |  | Magnesium hydroxide | KISUMA 5L |  |  |  |  |  |  |
|  |  | Silica | CRYSTALITE 5X |  |  |  |  |  |  |
|  |  | Calcium carbonate | SOFTON 2200 | 20 | 20 | 20 | 20 | 20 | 20 |
|  |  | Silica | Aerosil 200 | 5 | 5 | 5 | 5 | 5 | 5 |
|  | Silane coupl. agent | Vinyl trimethoxysilane | KBM-1003 | 5 | 5 | 5 | 5 | 5 | 5 |

TABLE 1-continued

| Cat. MB | Carrier resin | Chlorinated polyethylene | ELASLEN 402NA-X5 | 6 | 3 | | | | |
|---|---|---|---|---|---|---|---|---|---|
| | (rest of base resin utilized in step (b)) | Polyvinyl chloride | ZEST1400 | | | 5 | 7 | 4 | 4 |
| | | Trimellitate plasticizer | ADECASIZER C-9N | 1 | 1 | 2 | 2 | 2 | 2 |
| | Silanol condens. cat. | Dioctyltin dilaurate | ADKSTAB OT-1 | 0.05 | 0.05 | 0.05 | 0.04 | 0.05 | 0.05 |
| | Antioxidant | Hindered phenol | IRGANOX 1010 | 0.1 | 0.1 | 0.1 | 0.1 | 0.1 | 0.1 |
| | | Content of the plasticizer in the base material | | 28 | 55 | 29 | 4 | 33 | 33 |
| Evaluation | | Heat resistance test (200° C., 30 min) | | A | C | C | B | C | A |
| | | Durometer hardness | | 68 | 52 | 82 | 98 | 70 | 74 |
| | | Tensile strength (MPa) | | 8 | 4 | 19 | 20 | 12 | 9 |
| | | Tensile elongation (%) | | 80 | 390 | 270 | 100 | 290 | 80 |
| | | Cold resistance test 1 (Reference test) | | A | A | A | D | A | A |
| | | Cold resistance test 2 (Reference test) | | A | A | A | D | A | D |
| | | Extrusion outer appearance test (Reference test) | | C | C | A | A | A | C |

Note in Table 1 above:
Catalyst MB: Cat. MB
Trimellitic acid ester-based plasticizer: Trimellitate plasticizer
PE-based plasticizer: Polyester-based plasticizer
Phthalic acid ester-based plasticizer: Phthalate plasticizer
Silane coupling agent: Silane coupl. agent
Silanol condensation catalyst: Silanol condens. cat.
Antioxidant: Antioxidizing agent The results from Table 1 show the followings.

Comparative Examples were poor in any of mechanical strength, flexibility, and heat resistance. Comparative Example 1, in which a base resin containing no polyvinyl chloride was used in a silane MB, was poor in mechanical strength because of low tensile elongation. Comparative Example 2, in which a base resin having too high content percentage of the plasticizer was used in a silane MB, was poor in heat resistance, flexibility, and mechanical strength (tensile strength). Comparative Example 3, in which a base resin containing no chlorinated polyethylene was used in a silane MB, was poor in heat resistance. Comparative Example 4, in which a base resin having too low content percentage of the plasticizer was used in a silane MB, was poor in flexibility because of high durometer hardness. Comparative Example 5, in which the content of the organic peroxide was too low, was poor in heat resistance. Comparative Example 6, in which a silane MB having too high content of the organic peroxide was used, was poor in mechanical properties because of low tensile strength and low tensile elongation.

In contrast, Examples according to the present invention each passed in each of evaluations regarding mechanical strength, flexibility and heat resistance, and therefore allow production of the heat-resistant chlorine-containing crosslinked resin formed body having combined both the mechanical strength and the flexibility.

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2017-061904 filed in Japan on Mar. 27, 2017, which is entirely herein incorporated by reference.

The invention claimed is:

1. A method of producing a heat-resistant chlorine-containing crosslinked resin formed body, formed from:
   (a) a step of melt-mixing, with respect to 100 parts by mass of a base resin containing a chlorinated polyethylene and a polyvinyl chloride and a plasticizer, from 0.003 to 0.3 parts by mass of an organic peroxide, from 0.5 to 400 parts by mass of an inorganic filler, and from more than 2 parts by mass to 15.0 parts by mass or less of a silane coupling agent having a grafting reaction site that is capable of causing a grafting reaction to the base resin, at a temperature equal to or higher than a decomposition temperature of the organic peroxide, thereby for subjecting the resultant mixture to the grafting reaction, wherein the step (a) comprises:
      (a-1) a step of mixing the inorganic filler and the silane coupling agent, to prepare a mixture;
      (a-2): a step of melt-mixing the mixture obtained in the step (a-1) with all or part of the base resin, in the presence of the organic peroxide, at a temperature equal to or higher than a decomposition temperature of the organic peroxide, to cause a grafting reaction of the base resin with the silane coupling agent;
   (b) a step of mixing a silane masterbatch obtained in the step (a) and a silanol condensation catalyst, and then forming the mixture; and
   (c) a step of silane-crosslinking by bringing the resultant formed body obtained by the step (b) into contact with water;
   wherein, in the step (a-2), the plasticizer is contained in an amount of from 15% to 55% by mass in 100% by mass of the base resin to be used in the grafting reaction with the silane coupling agent; and
   wherein any part of the base resin not used in the step (a) is mixed in the step (b).

2. The method of producing a heat-resistant chlorine-containing crosslinked resin formed body according to claim 1, wherein the plasticizer includes a phthalate ester-based plasticizer, a trimellitate ester-based plasticizer, a polyester-based plasticizer, an adipate ester-based plasticizer, or a pyromellitate-based plasticizer, or a combination thereof.

3. The method of producing a heat-resistant chlorine-containing crosslinked resin formed body according to claim 1, wherein the plasticizer includes a phthalate ester-based plasticizer or a trimellitate ester-based plasticizer, or a combination thereof.

4. The method of producing a heat-resistant chlorine-containing crosslinked resin formed body according to claim 1, wherein from 15% to 40% by mass of the plasticizer is contained in 100% by mass of the base resin to be used in the reaction with the silane coupling agent.

5. The method of producing a heat-resistant chlorine-containing crosslinked resin formed body according to claim 1, wherein part of the base resin is melt-mixed in the step (a), and the rest of the base resin is mixed in the step (b).

6. The method of producing a heat-resistant chlorine-containing crosslinked resin formed body according to claim 1, wherein at least one of the melt-mixing in the step (a) and the mixing in the step (b) is carried out in the presence of hydrotalcite.

7. The method of producing a heat-resistant chlorine-containing crosslinked resin formed body according to claim 1, wherein a ratio of content percentages of the chlorinated polyethylene and the polyvinyl chloride in the base resin to be used in the reaction with the silane coupling agent {(content percentage of chlorinated polyethylene):(content percentage of polyvinyl chloride)} is set to a range of from 95:5 to 10:90 by mass ratio.

8. The method of producing a heat-resistant chlorine-containing crosslinked resin formed body according to claim 1, wherein the content of the organic peroxide is from 0.005 to 0.3 parts by mass.

9. The method of producing a heat-resistant chlorine-containing crosslinked resin formed body according to claim 1, wherein the content of the silane coupling agent is from 3 to 12.0 parts by mass.

10. The method of producing a heat-resistant chlorine-containing crosslinked resin formed body according to claim 1, wherein the silane coupling agent includes vinyl trimethoxysilane or vinyl triethoxysilane.

11. The method of producing a heat-resistant chlorine-containing crosslinked resin formed body according to claim 1, wherein the inorganic filler include hydrotalcite, silica, boehmite, clay, talc, aluminum hydroxide, magnesium hydroxide, or calcium carbonate, or a combination thereof.

12. The method of producing a heat-resistant chlorine-containing crosslinked resin formed body according to claim 1, wherein the melt-mixing in the step (a) is carried out in a closed mixer.

13. A silane masterbatch to be used to produce a masterbatch mixture formed by mixing, with respect to 100 parts by mass of a base resin containing a chlorinated polyethylene and a polyvinyl chloride and a plasticizer, from 0.003 to 0.3 parts by mass of an organic peroxide, from 0.5 to 400 parts by mass of an inorganic filler, from more than 2 parts by mass to 15.0 parts by mass or less of a silane coupling agent having a grafting reaction site that is capable of causing a grafting reaction to the base resin, and a silanol condensation catalyst,
wherein the silane masterbatch contains from 15% to 55% by mass of the plasticizer in 100% by mass of all or part of the base resin, and is formed by melt-mixing all or part of the base resin, together with the organic peroxide, the inorganic filler, and the silane coupling agent at a temperature equal to or higher than a decomposition temperature of the organic peroxide, thereby for subjecting the resultant mixture to the graft reaction; and
wherein any part of the base resin not used in the melt-mixing step remains.

14. A masterbatch mixture, containing the silane masterbatch according to claim 13 and the silanol condensation catalyst.

15. A heat-resistant chlorine-containing crosslinked resin formed body, comprising the masterbatch mixture according to claim 14.

16. A heat-resistant chlorine-containing crosslinked resin formed body, which is produced by the method of producing a heat-resistant chlorine-containing crosslinked resin formed body according to claim 1.

17. The heat-resistant chlorine-containing crosslinked resin formed body according to claim 16, wherein the base resin is crosslinked with the inorganic filler through a silanol bond.

18. A heat-resistant chlorine-containing crosslinked resin formed body, including a cured product containing: a base resin-constituent including a chlorinated polyethylene and a polyvinyl chloride and from 15% to 50% by mass of a plasticizer; an inorganic filler-constituent; and a silane coupling agent-constituent, as each constituent,
wherein the content of the inorganic filler-constituent is from 0.5 to 400 parts by mass and the content of the silane coupling agent-constituent is more than 2 parts by mass and 15.0 parts by mass or less, respectively, with respect to 100 parts by mass of the base resin-constituent, and
wherein the cured product contains: an inorganic filler-cured product formed by binding the chlorinated polyethylene-constituent or the polyvinyl chloride-constituent and the inorganic filler-constituent through the silane coupling agent-constituent; and a chlorine-containing resin-cured product formed by crosslinking the chlorinated polyethylene-constituent or the polyvinyl chloride-constituent by the silane coupling agent-constituent.

19. A heat resistant product, containing the heat-resistant chlorine-containing crosslinked resin formed body according to claim 15.

20. The heat resistant product according to claim 19, wherein the heat-resistant chlorine-containing crosslinked resin formed body is a coating of an electric wire or an optical fiber cable.

21. The method of producing a heat-resistant chlorine-containing crosslinked resin formed body according to claim 1, wherein the base resin used in the reaction with the silane coupling agent further contains the chlorinated polyethylene and the polyvinyl chloride.

* * * * *